(12) United States Patent
Nagura et al.

(10) Patent No.: US 11,478,705 B2
(45) Date of Patent: Oct. 25, 2022

(54) PROGRAM, TERMINAL, GAME SYSTEM, AND PROVISION DEVICE

(71) Applicant: BANDAI CO., LTD., Tokyo (JP)

(72) Inventors: Takashi Nagura, Tokyo (JP); Hideto Kotani, Tokyo (JP); Nao Yamaguchi, Tokyo (JP); Masahiko Saito, Tokyo (JP); Hyunsoo Lee, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 0 days.

(21) Appl. No.: 17/085,920

(22) Filed: Oct. 30, 2020

(65) Prior Publication Data

US 2021/0154580 A1    May 27, 2021

(30) Foreign Application Priority Data

Nov. 22, 2019 (JP) .............................. JP2019-211880

(51) Int. Cl.
 *A63F 13/537* (2014.01)
(52) U.S. Cl.
 CPC .................................. *A63F 13/537* (2014.09)
(58) Field of Classification Search
 CPC ..... A63F 13/2145; A63F 13/69; A63F 13/537
 See application file for complete search history.

(56) References Cited

U.S. PATENT DOCUMENTS

| | | | | |
|---|---|---|---|---|
| 2013/0128229 A1* | 5/2013 | Huang | ................... | A61B 3/032 351/239 |
| 2015/0050997 A1* | 2/2015 | Suzman | ................... | A63F 13/63 463/31 |
| 2019/0192973 A1* | 6/2019 | Kubota | ................. | A63F 13/822 |
| 2019/0351316 A1* | 11/2019 | Almarashda | .......... | A63F 3/0423 |

FOREIGN PATENT DOCUMENTS

| | | |
|---|---|---|
| JP | 5086487 B1 | 9/2012 |
| JP | 2013-150677 A | 8/2013 |
| JP | 5526494 B1 | 6/2014 |
| JP | 2017-196332 A | 11/2017 |
| JP | 2018-140203 A | 9/2018 |
| JP | 6455904 B1 | 1/2019 |
| JP | 2017-048115 A | 3/2019 |
| JP | 6521550 B1 | 5/2019 |

OTHER PUBLICATIONS

JP 2019-211880 Notice of Reasons for Refusal dated May 15, 2020. English Translation.

(Continued)

*Primary Examiner* — Steve Rowland
(74) *Attorney, Agent, or Firm* — Alston & Bird LLP

(57) ABSTRACT

The present invention relates to a program causing a computer to function as: a display control unit configured to display a first game element possessed by a player in a first display mode, and display a first game element not possessed by the player in a second display mode different from the first display mode; and a transition unit configured to cause transition to a provision screen on which a procedure for providing the first game element is performed, when a predetermined operation is performed on the first game element displayed in the second display mode.

15 Claims, 24 Drawing Sheets

(56) References Cited

OTHER PUBLICATIONS

JP 2019-211880 Notice of Reasons for Refusal dated Sep. 7, 2020, English Translation.
JP 2019-211880 Notice of Reasons for Refusal dated Dec. 17, 2020, English Translation.
JP 2019-211880 Decision to Grant a Patent dated Jun. 1, 2021, English Translation.
"MTG Arena, Convenient function! How to get and use wildcards," retrieved at https://jippe-game.com/mtg/wildcard/on May 16, 2022, dated May 19, 2019, Machine translation.
"Dragon Quest Rivals Ace Ratings and App Information," retrieved at https://gamewith.jp/gamedb/show/2025?from=ios on May 16, 2022, dated Jul. 6, 2021, Machine translation.
Gigazine, "Pokemon Comaster," retrieved at https://gigazine.net/news/20160424-pokemon-comaster/ on May 16, 2022, dated Apr. 24, 2016, Machine translation.

\* cited by examiner

FIG. 4

| CARD IDENTIFICATION INFORMATION | POSSESS FLAG |
|---|---|
| 001 | 1 |
| 002 | 1 |
| 003 | 1 |
| 004 | 0 |

...

| 1000 | 0 |

FIG. 5

| CARD IDENTIFICATION INFORMATION | 001 |
|---|---|
| CHARACTER IMAGE | DATA |
| CARD NAME | AAA |
| CARD TYPE | FIELD MINION |
| COST COUNT | 3 |
| COLOR | RED |
| TRIBE | BBB |
| ABILITY | FLAME |
| ATTACK POWER | 100 |
| HP | 300 |
| RARITY | 2 |

FIG. 6

| DECK 1 ||
|---|---|
| CARD IDENTIFICATION INFORMATION | 001 |
| CARD IDENTIFICATION INFORMATION | 006 |

...

| CARD IDENTIFICATION INFORMATION | 023 |
|---|---|

| | |
|---|---|
| BUDDY IDENTIFICATION INFORMATION | 001 |
| BUDDY IMAGE | DATA |
| BUDDY NAME | AAA |
| LEVEL | 2 |
| CHARACTER INFORMATION | DATA |

PROGRAM, TERMINAL, GAME SYSTEM, AND PROVISION DEVICE

CROSS REFERENCES TO RELATED APPLICATIONS

This application claims priority to Japanese Patent Application No. 2019-211880 filed in the Japan Patent Office on Nov. 22, 2019, the entire contents of which are incorporated herein by reference.

BACKGROUND

Field of the Invention

The present invention relates to a program, a terminal, a game system, and a provision device, and particularly relates a program, a terminal, a game system, and a provision device related to a game.

Description of the Related Art

Conventionally, a game system providing an item (game element) that is purchased by a player to be used in a game has been known (JP-A-2018-140203, for example). In such a game system, a virtual shop is provided in a game space (network space), and a player of the game performs a procedure to purchase an item on a screen of the shop. The transition to the shop screen occurs when a player selects (touch in a case of a touch screen, the same applies hereinbelow) a shop transition button provided on a home screen (main screen) of a game executed by the game system.

SUMMARY

The game system described above has had a task of enabling an item to be acquired without making the game less entertaining to the player.

An aspect of the present invention is a program causing a computer to function as: a display control unit configured to display a first game element possessed by a player in a first display mode, and display a first game element not possessed by the player in a second display mode different from the first display mode; and a transition unit configured to cause transition to a provision screen on which a procedure for provision of the first game element is performed, when a predetermined operation is performed on the first game element displayed in the second display mode.

An aspect of the present invention is a terminal comprising: a display control unit configured to display a first game element possessed by a player in a first display mode, and display a first game element not possessed by the player in a second display mode different from the first display mode; and an acquisition unit configured to acquire at least one first game element, when payment of a cost of the first game element displayed in the second display mode is approved.

An aspect of the present invention is a game system comprising: a display control unit configured to display a first game element possessed by a player in a first display mode, and display a first game element not possessed by the player in a second display mode different from the first display mode; a transition unit configured to cause transition to a provision screen on which a procedure for provision of the first game element is performed, when a predetermined operation is performed on the first game element displayed in the second display mode; a provision unit configured to provide at least one first game element when a predetermined procedure is performed on the provision screen; and an acquisition unit configured to acquire and hold the first game element provided.

An aspect of the present invention is a provision device comprising: a reception unit configured to receive, from a terminal on which a first game element is displayed in different display modes depending on whether a player possesses the first game element, a request for provision of a first game element not possessed by the player; and a transition unit configured to make a screen on the terminal transition to a provision screen on which a procedure for provision of the first game element is performed, in response to the request for provision.

With the present invention, the player can be guided to a shop without feeling the game less entertaining.

BRIEF DESCRIPTION OF THE DRAWINGS

FIG. 4 is a diagram illustrating an example of possessed card data;

FIG. 5 is a diagram illustrating an example of card character data;

FIG. 6 is a diagram illustrating an example of deck setting data;

DETAILED DESCRIPTION

The present disclosure now will be described more fully hereinafter with reference to the accompanying drawings in which some but not all embodiments of the disclosure are shown. Indeed, these embodiments may be embodied in many different forms and should not be construed as limited to the embodiments set forth herein; rather, these embodiments are provided so that this disclosure will satisfy applicable legal requirements.

Overall Configuration

Figure 1:
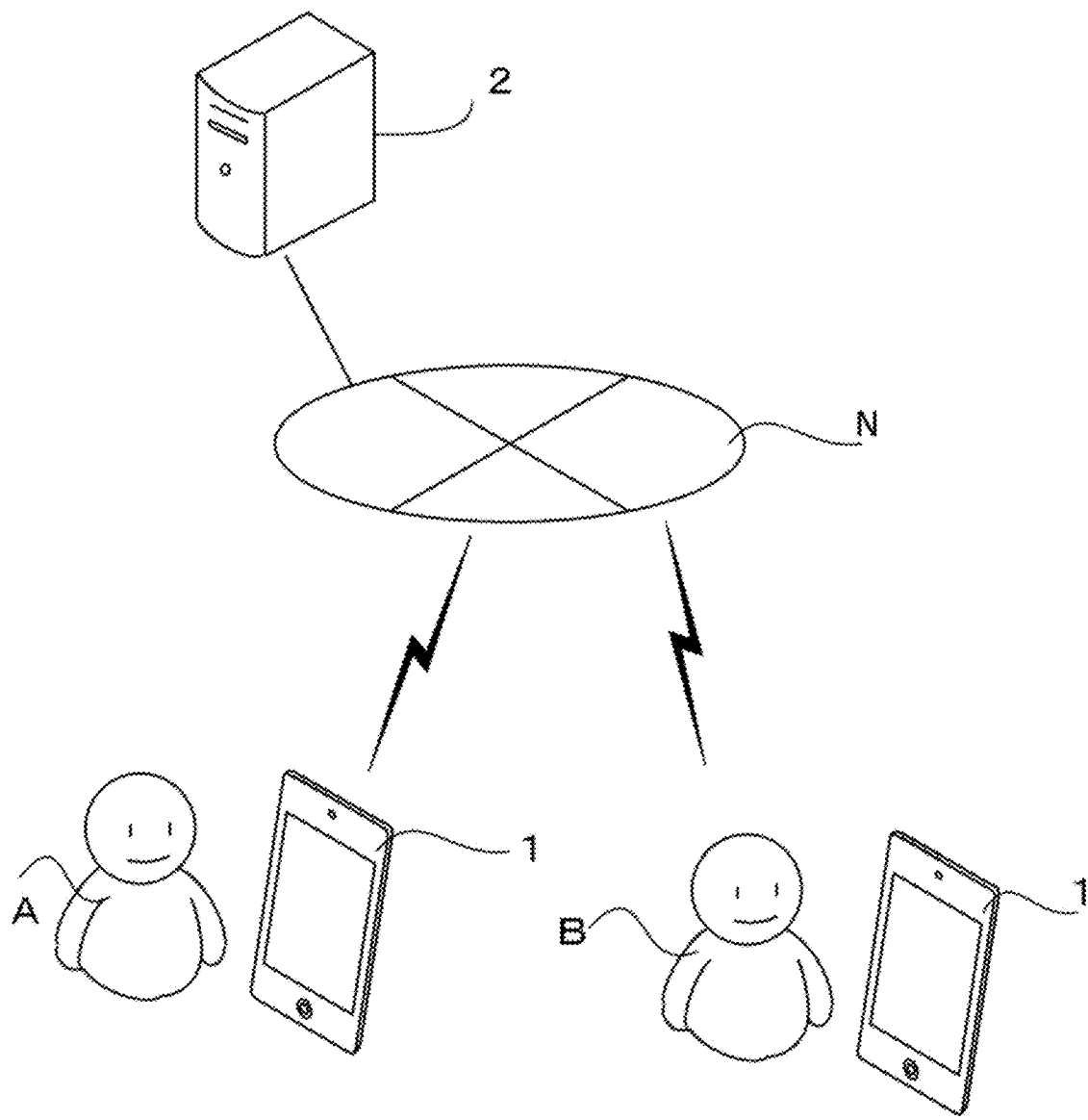
FIG. 1 is a diagram illustrating an example of an overall configuration of a game system according to the present embodiment.

FIG. 1 is a diagram illustrating an example of an overall configuration of a game system according to the present embodiment. As illustrated in FIG. 1, the game system includes player terminals 1 respectively prepared for players A and B of the game, and a game server 2. The player terminals 1 and the game server 2 can be connected to a communication line N, and thus can communicate with each other.

The communication line N is a communication channel that enables data communications. Specifically, the communication line N includes a communication network such as a local area network (LAN) using a private line (private cable) for direct connection, Ethernet (registered trademark), and the like, as well as a telecommunication network, a cable network, and the Internet. The communication method may be a cable communication method or a wireless communication method.

The player terminal 1 is a computer capable of executing a game program, and can perform data communications with the game server 2 by being in connection with the communication line N via a radio communication base station and the like. Examples of the player terminal 1 include a smartphone, a mobile phone, a portable game device, a non-portable game device, an arcade game device, a personal computer, a tablet computer, and a controller of a non-portable game device. Basically, there are a plurality of player terminals 1 operated by respective players.

The game server 2 is a server system including one or a plurality of server apparatuses, storage devices, and the like. The game server 2 provides various services for running the game according to the present embodiment, and can perform management of data required for running the game, distribution of a game program and data required for executing the game on the player terminal 1, and the like.

Figure 2:
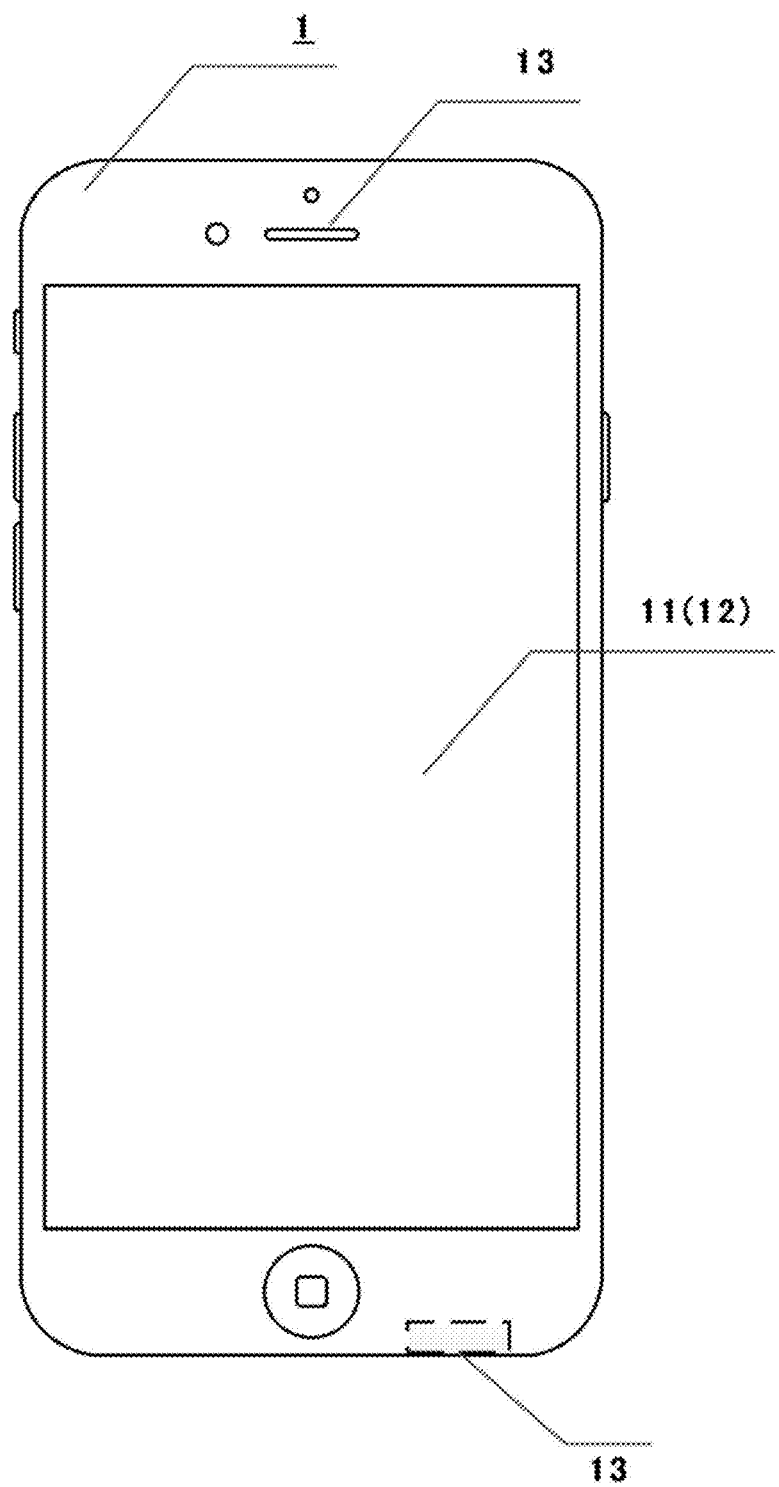
FIG. 2 is a diagram illustrating an example of an apparatus configuration of a smartphone that is an example of a player terminal 1.

FIG. 2 is a diagram illustrating an example of a device configuration of a smartphone which is an example of the player terminal 1. As illustrated in FIG. 2, the player terminal 1 includes a display 11, a touch operation panel 12 integrally configured with the display 11, and a speaker 13. The player terminal 1 is further provided with unillustrated elements such as a control board, an internal battery, a power button, and a volume control button.

The control board contains a microprocessor of various types (e.g., a central processing unit (CPU), a graphics processing unit (GPU), and a digital signal processor (DSP)), an IC memory of various types (e.g., an application specific integrated circuit (ASIC), a video random access memory (VRAM), a random access memory (RAM), and a read only memory (ROM)), a radio communication module for wirelessly communicating with a mobile phone base station, and the like. The control board further contains what is known as an interface circuit (I/F circuit) such as a driver circuit for the touch operation panel 12. These elements contained in the control board are electrically connected to each other via a bus circuit and the like, to be capable of writing and reading data to and from each other and of exchanging signals.

In the present embodiment, an example is described where the game system described above is applied a competition game using a first game element possessed by a first player A and a first game element possessed by a second player B as an opponent.

This first game element is a character, and is embodied as and represented by an image, a virtual or a tangible article, or the like. The image includes a still image and a movie. An example of a virtual or tangible article includes a virtual card displayed on a computer, a tangible card, and the like, for example. The article is not limited to cards, and may be articles other than cards, as long as the game element associated with the article can be identified. For example, the article may be a modeled object such as a figurine having an outer appearance of a game element.

The following description is given assuming that a character that can appear in the executed game in response to the use of the card is a character the action of which is controlled based on an operation by the player (including a non-player operated by a computer), and that a card have a graphic (an image representing the outer appearance of the character) of the corresponding character. However, this should not be construed as a limiting sense. It is a matter of course that a card identifying a game element of the executed game is not limited to those configured to enable a game element such as a character to be identified, and may be a card identifying other game elements such as an item, and an exercised effect.

A deck includes a predetermined number of first game elements. The predetermined number of first game elements are set as a deck of a player. For example, when the first game element is a virtual card displayed on a computer, the deck is a group of cards including a predetermined number of cards. The deck includes cards selected by the player. The player selects one of decks that have been set, and plays the game using the cards forming the deck.

The competition game adopting the present embodiment involves a second game element different from the first game element. The second game element is a character, as in the case of the first game element, but does not necessarily need to be associated with a virtual or a tangible article.

The second game element uses the first game element possessed by the player, in the game. Using the first game element includes selecting the first game element or determining an action of the first game element in the game. For example, when the first game element is a character embodied as a card, the second game element selects a card possessed by the player or autonomously or spontaneously (actively) determines an action, during a competition in the game. In other words, the second game element performs an operation that is similar to the selection of the first game element, determination of an action, and the like performed by a player, as in the case of a function of a non-player operated by a computer. Still, unlike the conventional non-players that are operated by a computer instead of a human player, the second game element exists separately and individually from the human player, and uses the first game element possessed by the player. Furthermore, unlike the conventional non-player, the second game element forms one group (pair) with the player. The second game element is not necessarily limited to a single element, and may comprise a plurality of types of elements. Thus, the player may be capable of selecting one or a plurality of second game elements.

The second game element has character information. This character information is information about strength (level) in the game and attribute (such as gender and personality) of the second game element. The autonomous or spontaneous (active) action of the second game element (use of the first game element) is influenced by the character information. In other words, the character information is an ability of the second game element, and difference in the ability results in a difference between second game elements in the autonomous or spontaneous (active) behavior (use of the first game element). The character information changes in response to a selection of the second game element, and as the game progresses.

Furthermore, the second game element evaluates the first game element possessed or acquired by a player. Specifically, the evaluation is made on a card to be acquired by the player, regarding an impact (advantage and disadvantage) on the game when the card is possessed, an impact on the deck when the card is selected as a card forming the deck.

The autonomous or spontaneous (active) action of the second game element described above is implemented based on information given by an AI function of the game server 2. This AI function is obtained by machine learning using training data such as the contents of game progression and their result in many competition games. A method of the machine learning includes but is not limited to deep learning, reinforcement learning, or combination of these.

The second game element described above will be referred to as a buddy in the following description.

Functional Configuration

Figure 3:
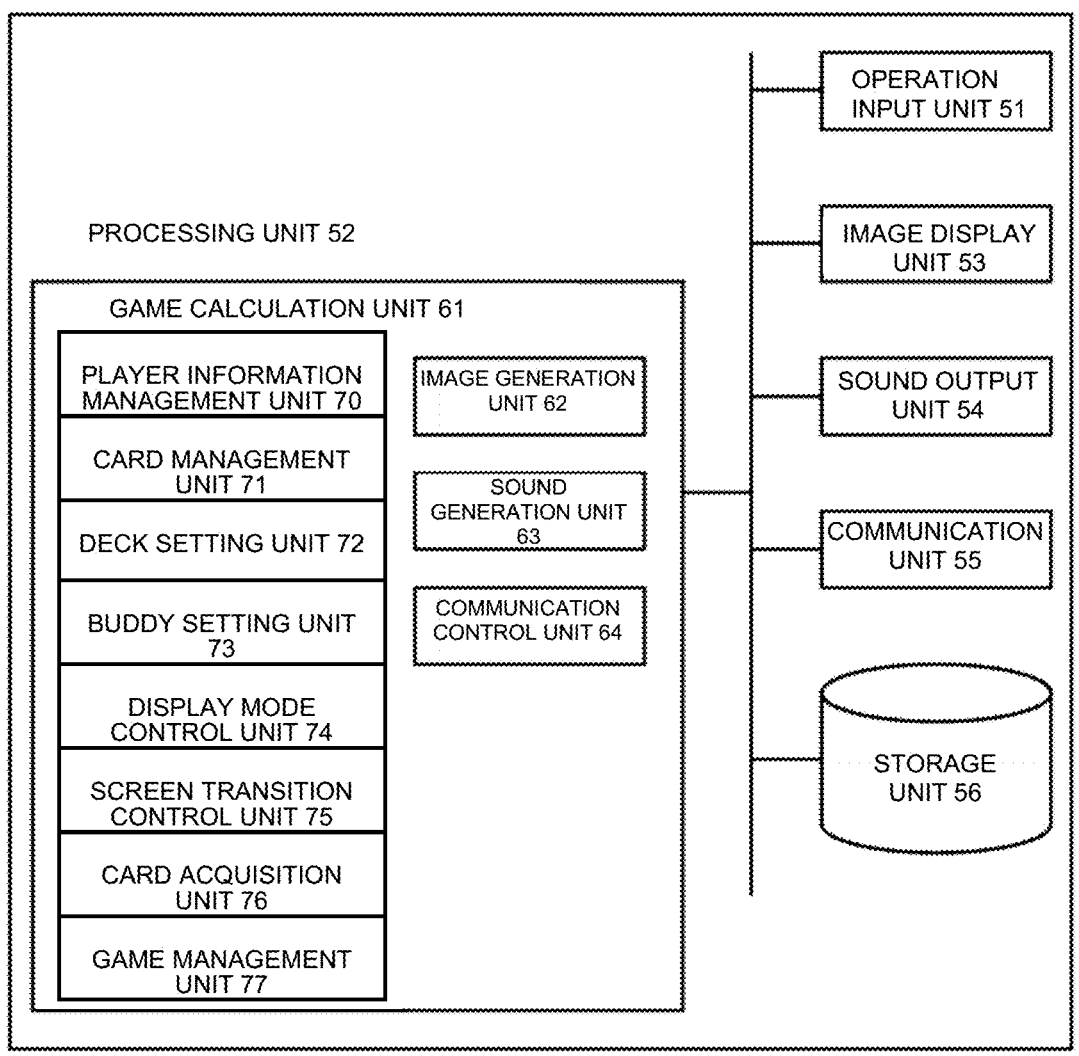
FIG. 3 is a block diagram illustrating an example of a functional configuration of the player terminal 1.

FIG. 3 is a block diagram illustrating an example of a functional configuration of the player terminal 1.

As illustrated in FIG. 3, the player terminal 1 includes an operation input unit 51, a processing unit 52, an image display unit 53, a sound output unit 54, a communication unit 55, and a storage unit 56.

The operation input unit 51 is used by the payer to input various operations related to the game, and outputs an operation input signal, corresponding to the operation input, to the processing unit 52. The function of the operation input unit 51 can be obviously implemented with an element directly operated by a finger of the player A such as a touch operation pad, a home button, a button switch, a joystick, a trackball, and can also be implemented with other elements including elements detecting motions and orientations such as an acceleration sensor, an angular velocity sensor, a tilt sensor, and a geomagnetic sensor. The operation input unit 51 corresponds to the touch operation panel 12 in FIG. 2.

The processing unit 52 performs comprehensive control on an operation of the player terminal 1, based on a program and data stored in the storage unit 56, the operation input signal from the operation input unit 51, and the like. For example, the function of the processing unit 52 can be implemented with electronic parts such as a microprocessor (such as a CPU and a GPU), an ASIC, and an IC memory. The processing unit 52 includes, as main functional units, a game calculation unit 61, an image generation unit 62, a sound generation unit 63, and a communication control unit 64.

The game calculation unit 61 executes various types of game processing to implement the game according to the present embodiment, and outputs the processing result to the image generation unit 62 and the sound generation unit 63. The game calculation unit 61 includes a player information management unit 70, a card management unit 71, a deck setting unit 72, a buddy setting unit 73, a display mode control unit 74, a screen transition control unit 75, a card acquisition unit 76, and a game management unit 77.

The player information management unit 70 uses player data to manage information about the player. The managed information includes basic user information such as a nickname of the player, the rank of the player, and the level of the buddy.

The card management unit 71 manages cards that can be provided by the game system, including possessed card data and card character data stored in the storage unit 56 and whether the player A or B possesses a card.

The possessed card data is data in which card identification information about a card that can be provided by the game system and a possess flag indicating whether the card is possessed by the player are associated with each other. FIG. 4 is a diagram illustrating an example of the possessed card data. In FIG. 4, card identification information about a card that can be provided by the game system is provided in a field for the card identification information. When the card corresponding to the card identification information is possessed by the user, the possess flag is set to be "1", and when the user does not possess the card, the possess flag is set to be "0". Note that the possessed card data illustrated in FIG. 4 is merely an example, and the data is not limited to this.

The card character data is data in which card identification information about a card and character information about the card are associated with each other. FIG. 5 is a diagram illustrating an example of the card character data. In FIG. 5, the card identification information and character information (character image, card name, card type, cost count, color, tribe, ability, attack power, hit point, and rarity) are associated with each other. The card character data illustrated in FIG. 5 is merely an example, and thus the data is not limited to this.

When there is a card that can be newly provided, the card management unit 71 communicates with the game server 2 to acquire card identification information about the card and card character data associated with the card identification information. The card management unit 71 adds the card identification information to the possessed card data, and sets the possess flag of the card identification information to be "0". The card character data acquired is stored in the storage unit 56.

The deck setting unit 72 presents cards (basically, possessed cards) that are currently usable as cards forming the deck by using the possessed card data and the card character data, and sets the deck by selecting the cards forming the deck from the cards thus presented based on an operation performed by the user. The deck setting unit 72 generates deck setting data in which the name of the deck thus set and card identification information about each of the cards forming the deck are associated with each other, and stores the data in the storage unit 56. FIG. 6 is a diagram illustrating an example of the deck setting data. In the example illustrated in FIG. 6, an example of the deck setting data about a deck 1 of the player A is illustrated. Specifically, an example is illustrated where the deck 1 includes cards with card identification information pieces "001" and "006" to "023". FIG. 6 illustrates an example of the deck setting data, and thus the data is not limited to this.

Figures 7, 8:
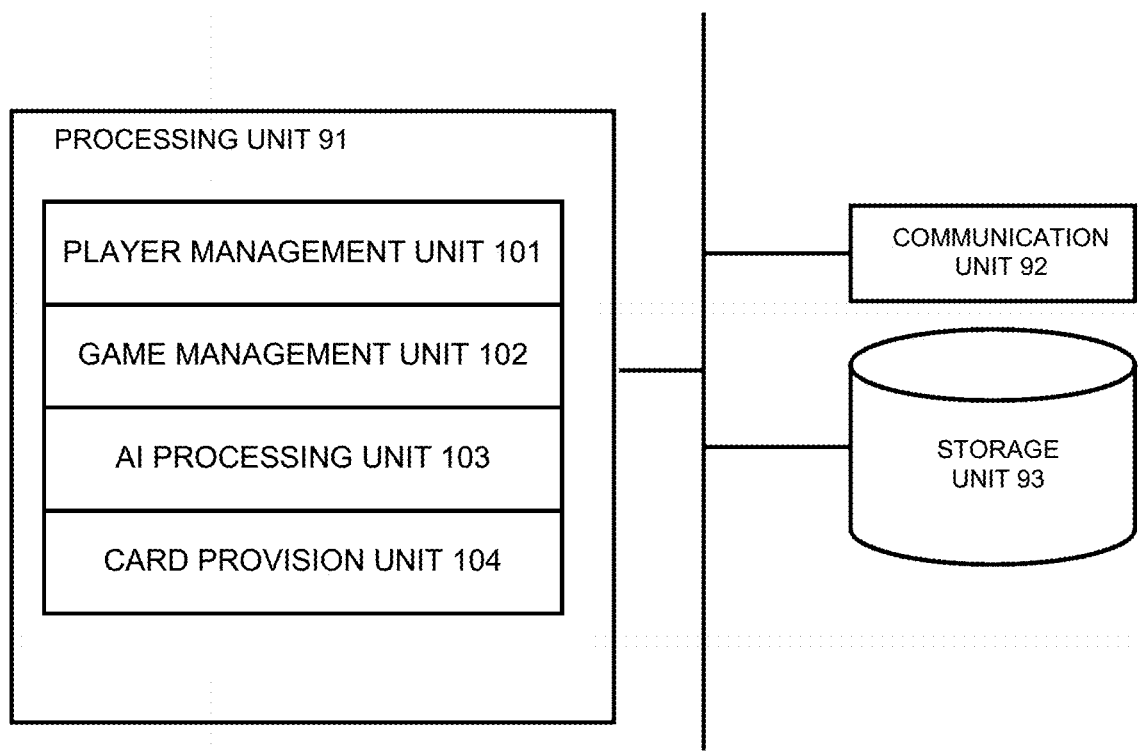
FIG. 7 is a diagram illustrating an example of buddy setting data about a player A.
FIG. 8 is a block diagram illustrating an example of a functional configuration of a game server 2.

The buddy setting unit 73 uses buddy setting data to manage information about the buddies selected by the players A and B from a plurality of buddies (second game elements) at the time of account registration. The buddy setting data is character information about the buddy selected in the menu setting. The character information about the buddy changes as the game progresses. When the change is made, the character information after the change is informed from the game server 2, and the character information is updated. FIG. 7 is a diagram illustrating an example of the buddy setting data about the player A. In the example illustrated in FIG. 7, the buddy setting data includes buddy identification information, a buddy image, as well as the name, level, and character information of the buddy. FIG. 7 illustrates an example of the buddy setting data, and thus the data is not limited to this.

The level of and the character information about the buddy (second game element) are set to be at initial values (lowest values) at the time of account registration. When the buddy is changed, the level of and the character information about the buddy (second game element) are set to be at initial values (lowest values), without using the level and the character information about the previous buddy. The buddy setting unit 72 outputs the image information about the buddy to the image generation unit 62, during the competition or while another menu screen is being displayed.

The display mode selection unit 74 controls a display mode of cards, when the cards are displayed. In the present embodiment, the cards possessed by the player are displayed in a first display mode, and cards not possessed by the player are displayed in a second display mode. Whether the card is possessed is determined using the possess flag in the possessed card data. The first display mode and the second display mode are assumed to be display modes that can be visually distinguished from each other. The first display mode and the second display mode as display modes that can be visually distinguished from each other can be achieved with the cards possessed by the player displayed (first display mode) in first coloring (color for example) and the cards not possessed by the player displayed (second display mode) in second coloring (for example grayscale or monochrome). Furthermore, the cards possessed by the player may be displayed (first display mode) without mosaic, and the cards not possessed by the player may be displayed (second display mode) with mosaic. Furthermore, the cards possessed by the player may be displayed (first display mode) with a movie and the cards not possessed by the player may be displayed (second display mode) with a still image. The first display modes and the second display mode described above are examples, and other display modes may be employed.

The screen transition control unit 75 controls transitions between screens, in response to selection of cards and various approvals by the player. Specifically, the transition to a provision screen for performing a procedure to provision of cards occurs when a predetermined operation is performed in the second display mode. The provision screen is, for example, a screen illustrating a shop from which a card and an item can be acquired (purchased). For example, the predetermined operation is: selection of an unpossessed card displayed in the second display mode, through an operation (such as touch, swipe, and click) by the player using the operation input unit 51; approval for transitioning to the provision screen (shop screen); or the approval for the selection and the transition.

The transition to the provision screen (shop screen) by the screen transition control unit 75 is implemented by requesting the game server 2 for the transition to the provision screen (shop screen), receiving the provision screen from the game server 2, and displaying the provision screen (shop screen).

The card acquisition unit 76 executes acquisition processing for a card on the provision screen (shop screen). Specifically. the card acquisition unit 76 issues a request for a purchase screen for a card desired to be acquired to the game server 2, executes processing of displaying the purchase screen for the card desired to be acquired, and performs an operation for approving the payment of a cost for acquiring the card. This cost includes money (cash, credit card), a currency in the game, and a voucher (including a ticket in the game). When the card unpossessed by the player is acquired, the card acquisition unit 76 sets the possess flag in the card identification information about the card acquired in the possessed card data to be "1".

The game management unit 77 manages the progress of the game as a whole including a competition in the game.

The image generation unit 62 generates one game screen per one frame time (1/60 seconds for example) based on the result of the processing by the game calculation unit 61, and outputs an image signal corresponding to the generated game screen to the image display unit 103. The function of the image generation unit 62 can be implemented by, for example, a processor such as a GPU, a DSP, a video signal IC, a program such as a video codec, a rendering frame IC memory such as a frame buffer, an IC memory used for expanding texture data, and the like.

The sound generation unit 63 generates sound information (about sound effect, BGM, and operation assist information related to the game) and a sound signal corresponding to various operation sounds and the like, based on the result of the processing by the game calculation unit 61, and outputs the information and the signal to the sound output unit 54. The function of the sound generation unit 63 can be implemented by a processor such as a DSP and a sound synthesis IC, an audio codec that can replay a sound file, and the like, for example.

The communication control unit 64 executes communication connection and data processing for performing data communications with the game server 2.

The image display unit 53 displays various game screens based on the image signal received from the image generation unit 62. The function of the image display unit 53 can be implemented by a display device such as a flat panel display, a cathode ray tube (CRT), a projector, a head mounted display, for example. The image display unit 62 corresponds to the display 11 in FIG. 2 for example.

The sound output unit 54 outputs sound such as sound effect related to the game, based on the sound signal received from the sound generation unit 63. The sound output unit 54 corresponds to the speaker 13 in FIG. 2, for example.

The communication unit 55 implements communications by connecting to the communication line N. The function of the communication unit 55 can be implemented by a radio communication device, a modem, a terminal adaptor (TA), a jack for a cable for wired communications, a control circuit, and the like.

In the storage unit 56, a program for operating the player terminal 1 and implementing various functions of the player terminal 1, data used while the program is executed, and the like, are stored in advance or temporarily stored every time the processing is executed. The storage unit 56 can be implemented by a RAM, a ROM, an IC memory such as a flash memory, a magnetic disk such as hard disk, an optical disk such as a CD-ROM and DVD, and the like.

The storage unit 56 stores a system program and a game program. The system program is a program for implementing a basic computer function of the player terminal 1. The game program is a program for causing the processing unit 52 to function as the game calculation unit 61. The program is distributed from the game server 2 or another application distribution server, when the account registration by the player is completed.

The storage unit 56 stores possessed card data, card character data, deck setting data, and buddy setting data. Furthermore, required data (such as model data and texture data, motion data, and effect data for displaying an image of a character corresponding to the card or a buddy, a background image of the game screen, and sound data such as sound effect) are distributed and stored in the storage unit 56.

Next, a configuration of the game server 2 will be described. FIG. 8 is a block diagram illustrating an example of a functional configuration of the game server 2.

The game server 2 includes a processing unit 91, a communication unit 92, and a storage unit 93.

The processing unit 91 performs comprehensive control on the operations of the game server 2 based on the program and data stored in the storage unit 93, the information received, and the like. The function of the processing unit 91 can be implemented by electronic parts including a microprocessor such as a CPU and a GPU, an ASIC, and an IC memory. The processing unit 91 includes a player management unit 101, a game management unit 102, an AI processing unit 103, and a card provision unit 104.

The player management unit 101 manages, for each player terminal 1 connected thereto, the account, a game progress status, and the like, by using user information data described later. The user information data includes data similar to the player data, the possessed card data, the card character data, and the deck setting data described above, for each player.

The game management unit 103 manages the game as a whole.

The AI processing unit 103 includes an algorithm obtained through machine learning using training data such as the contents of the progression and their results in many competition games. The algorithm corresponds to the level and the character information of the buddy. The machine learning is typically, but without limitation, performed through deep learning. The AI processing unit 103 receives the card setting information, the level of and the character information about the buddy of the player of the player terminal 1, the competition mode, and the like transmitted from the player terminal 1, and outputs card operation information about the buddy under the condition indicated by the card setting information. The algorithm varies depending on the level of and the character information about the buddy. Thus, even when the card setting information transmitted from the player terminal 1 is the same, the card operation information output may vary if the level of and the character information about the buddy of the player vary.

The AI processing unit 103 also evaluates the first game element possessed or acquired by the player. Specifically, a card to be acquired by the player is evaluated in terms of an impact (advantage or disadvantage) on the game when the card is possessed, an impact on the deck when the card is selected as a card forming the deck, and the like.

The card provision unit 104 provides a card to the players A and B, and provides a function referred to as a shop. Specifically, the provision screen (a top screen of the shop for example) is transmitted in response to a request for the provision screen (shop screen) from the terminal 1.

The card provision unit 104 may provide a card with a shop by (1) providing a desired card only, (2) providing any one of cards of a series to which the desired card belongs, with the player having a certain chance of acquiring the desired card, (3) providing a package (a group including a plurality of cards of a series to which the desired card belongs) of a series including the desired card, with the package having a certain chance of including the card desired by the player. The storage unit 93 stores the card character data for each player as described above, as well as a chance of acquiring each card, card identification information about cards forming each package, a cost for acquiring each card, and the like. The card provision unit 104 uses these types of information to provide the card to the player.

The card provision unit 104 implements payment of the cost (cash, currency in the game, or ticket) for acquiring the card.

The communication unit 92 is connected the communication line N to implement communications.

The storage unit 93 stores a system program and a game program. The system program is a program for implementing the basic computer function of the game server 2. The game program is a program for causing the processing unit 91 to function as the player management unit 101, the game management unit 102, the AI processing unit 103, and the card provision unit 104.

The storage unit 93 further stores user information data, the card character data described above, and the like.

Operation

Next, operations of apparatuses with the configuration described above will be described.

Operations of each apparatus will be described. The following description will be given using a card collection in which a list of cards provided by the service can be viewed as an example.

Figure 9:
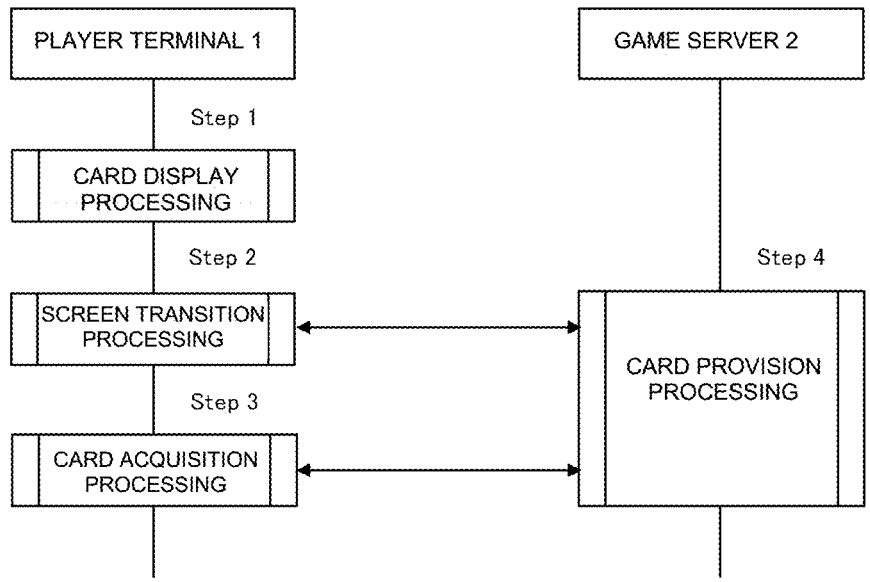
FIG. 9 is an overall sequence diagram illustrating operations between the player terminal 1 and the game server 2.

FIG. 9 is an overall sequence diagram illustrating for describing operations of the player terminal 1 and the game server 2.

In the player terminal 1, card display processing is executed (Step 1) to enable a list of cards provided by the service to be viewed. Then, the player selects a desired card from the cards displayed. Thus, screen transition processing to enable direct transition to the shop screen and card provision processing are executed, without displaying a home screen or a menu screen (Step 2, Step 4). After the transition to the shop screen, card acquisition processing for acquitting a card is executed in the player terminal 1 (Step 3), and the card provision processing for providing a card is executed in the game server 2 (Step 4).

Next, specific operations of each apparatus/device will be described.

Figure 10:
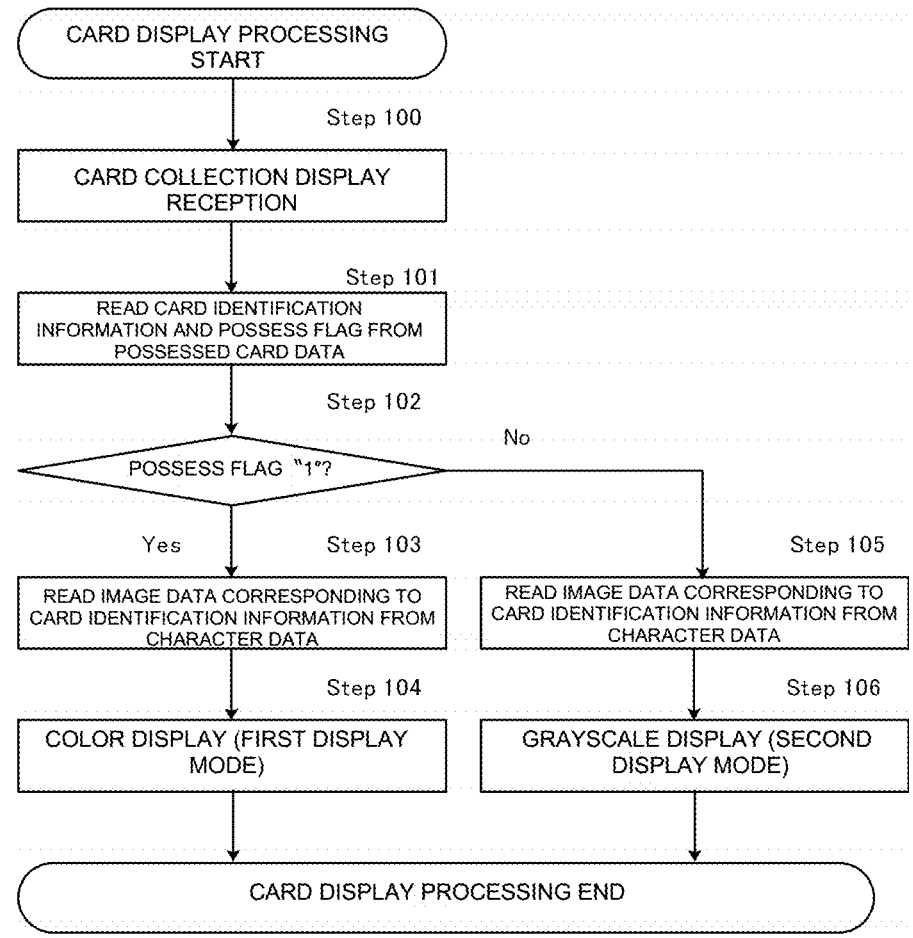
FIG. 10 is a flowchart illustrating operations in card display processing (Step 1) in the player terminal 1.

First of all, the card display processing (Step 1) in the player terminal 1 will be described. FIG. 10 is a flowchart illustrating operations in the card display processing (Step 1) in the player terminal 1.

First of all, a request for displaying the card collection is received on the home screen or the menu screen (Step 100). The display request for the card collection is issued when the operation input unit 51 detects a touching (selection) of a button corresponding to the card collection on the home screen, the menu screen, or the like.

When the display request for the card collection is received, the display mode selection unit 74 reads the card identification information and the possess flag from the possessed card data (Step 101). When the possess flag thus read is "1" (Step 102), the image data corresponding to the card identification information of the possess flag is read (step 103), and the card is displayed in color (first display mode) (Step 104). On the other hand, when the possess flag thus read is "0" (Step 102), image data corresponding to the card identification information of the possess flag is read (Step 105), and the card is displayed in grayscale (second display mode) (Step 106).

Figure 11:
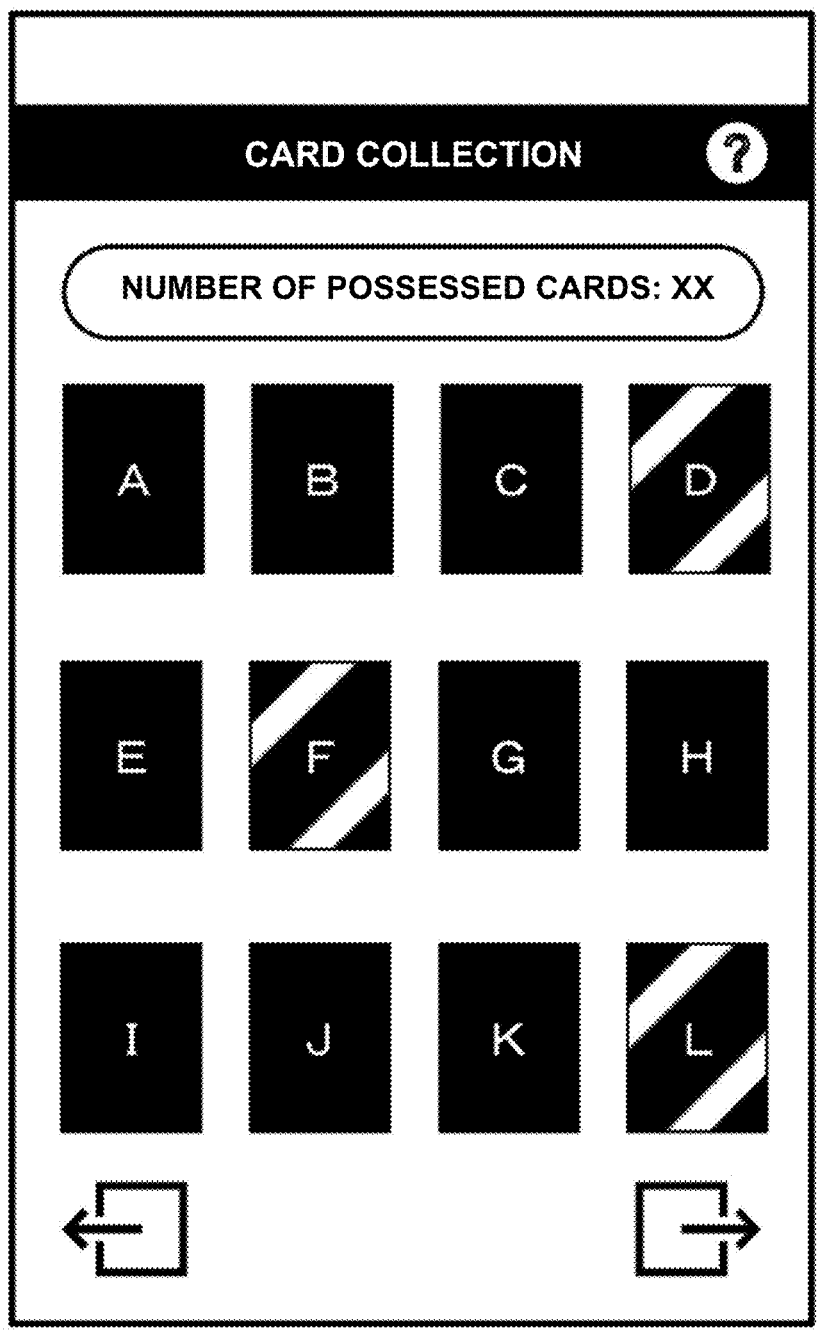
FIG. 11 is a diagram illustrating an example of a card collection displayed on a display unit 11 of the player terminal 1.

FIG. 11 is a diagram illustrating an example of a card collection displayed on a display unit 11 of the player terminal 1. In FIG. 11, cards A, B, C, E, G, H, I, J, and K possessed by the player are displayed in color, and cards D, F, and L not possessed by the player are displayed in grayscale. With the operation described above, the cards possessed by the player are displayed in color (first display mode), and the cards not possessed by the player are displayed in grayscale (second display mode), so that the player can recognize whether he or she possesses the card at glance.

Figure 12:
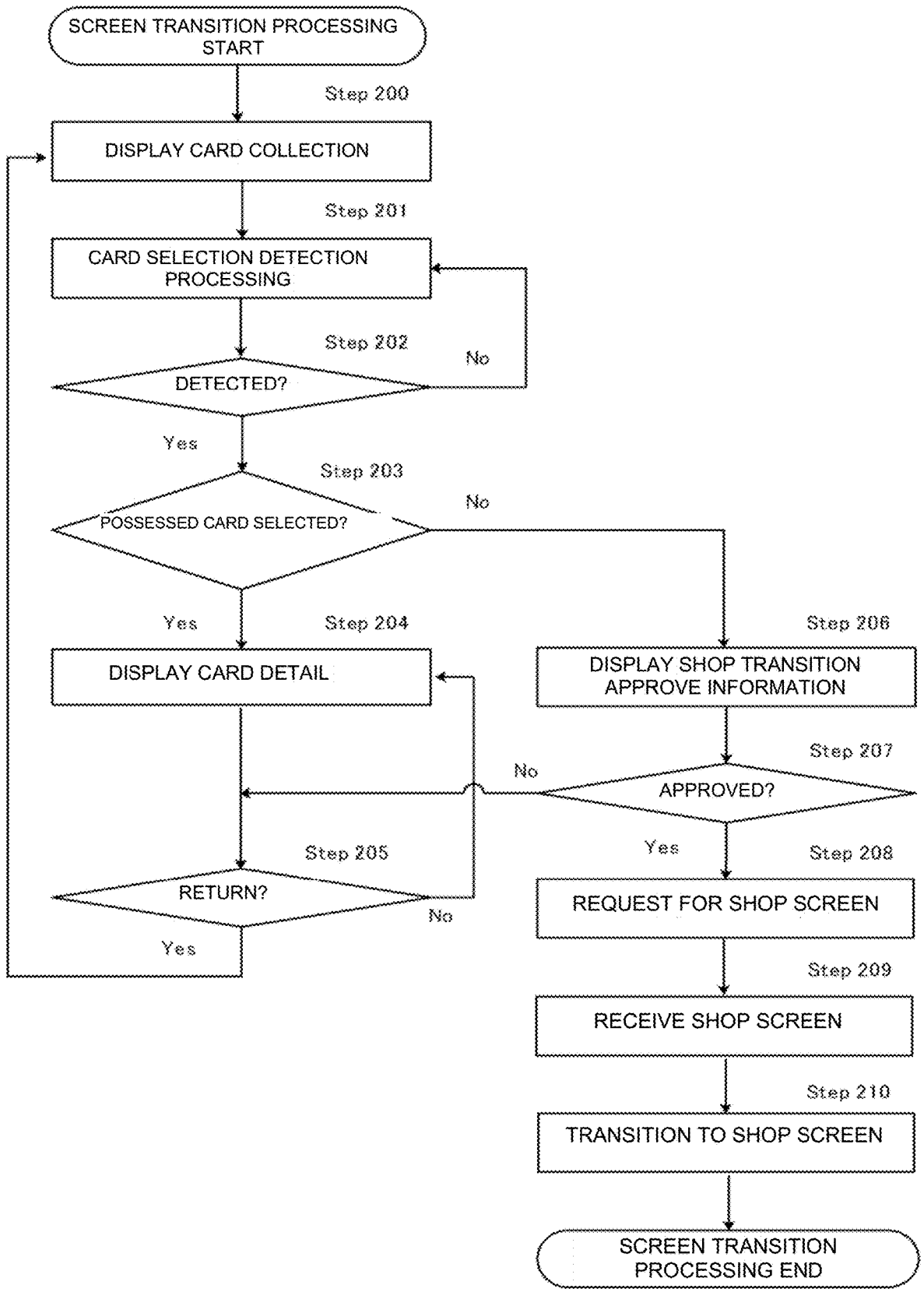
FIG. 12 is a flowchart illustrating operations in screen transition processing (Step 2) in the player terminal 1.

Next, the screen transition processing (Step 2) in the player terminal 1 will be described. FIG. 12 is a flowchart illustrating operations in the screen transition processing (Step 2) in the player terminal 1.

While the card collection is being displayed (Step 200), the screen transition control unit 75 executes processing of detecting the selection of a card by the player (Step 201). This card selection detection processing is performed with the operation input unit 51 detecting touching (selection) of a card displayed. When the touching (selection) of a card displayed is detected (Step 202), the whether the player possesses the selected card is determined based on the possess flag of the card (Step 203).

Figure 13:
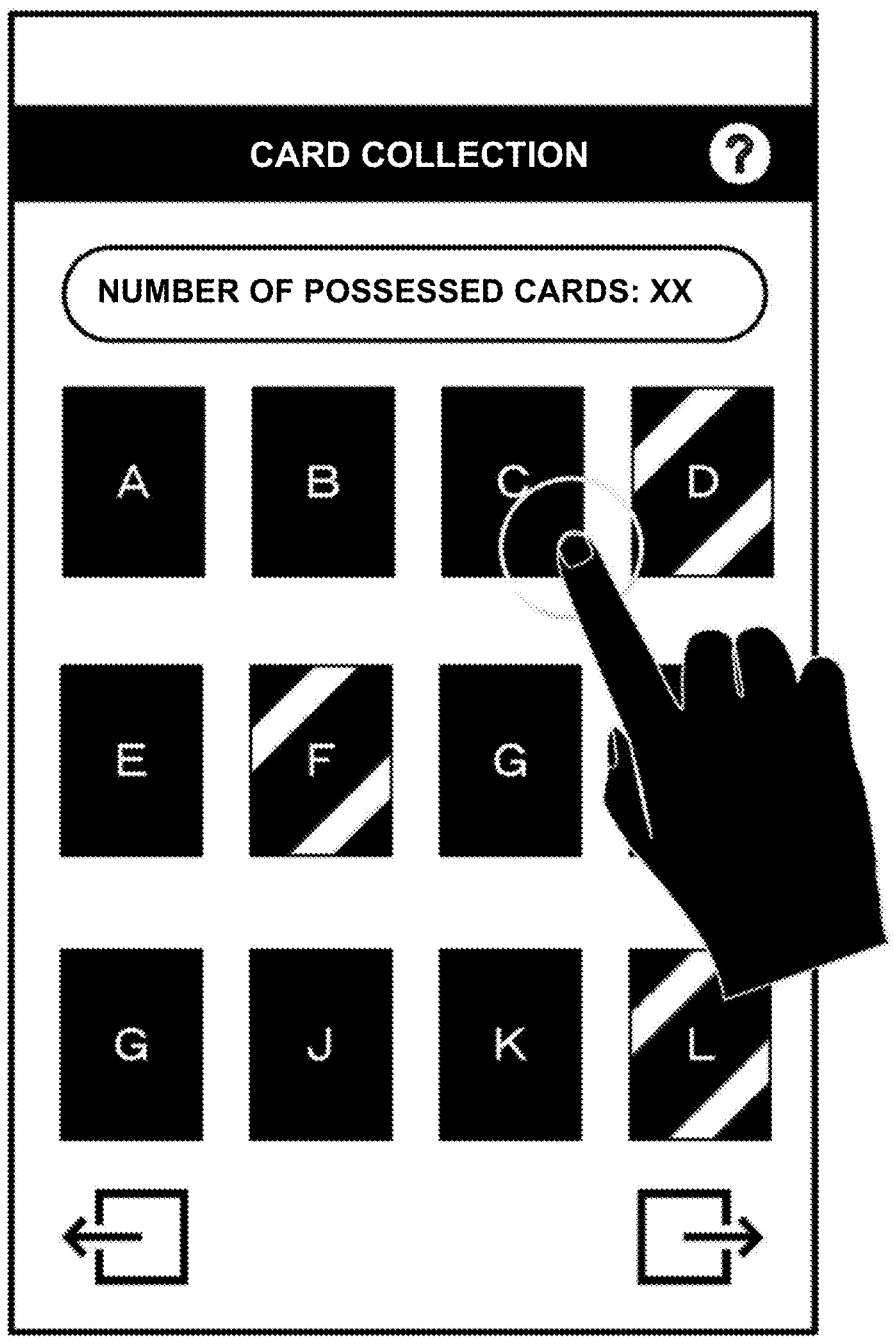
FIG. 13 illustrates an example where a card C is selected by being touched, the card C being one of cards displayed that is possessed by the player and being displayed in color.
Figure 14:
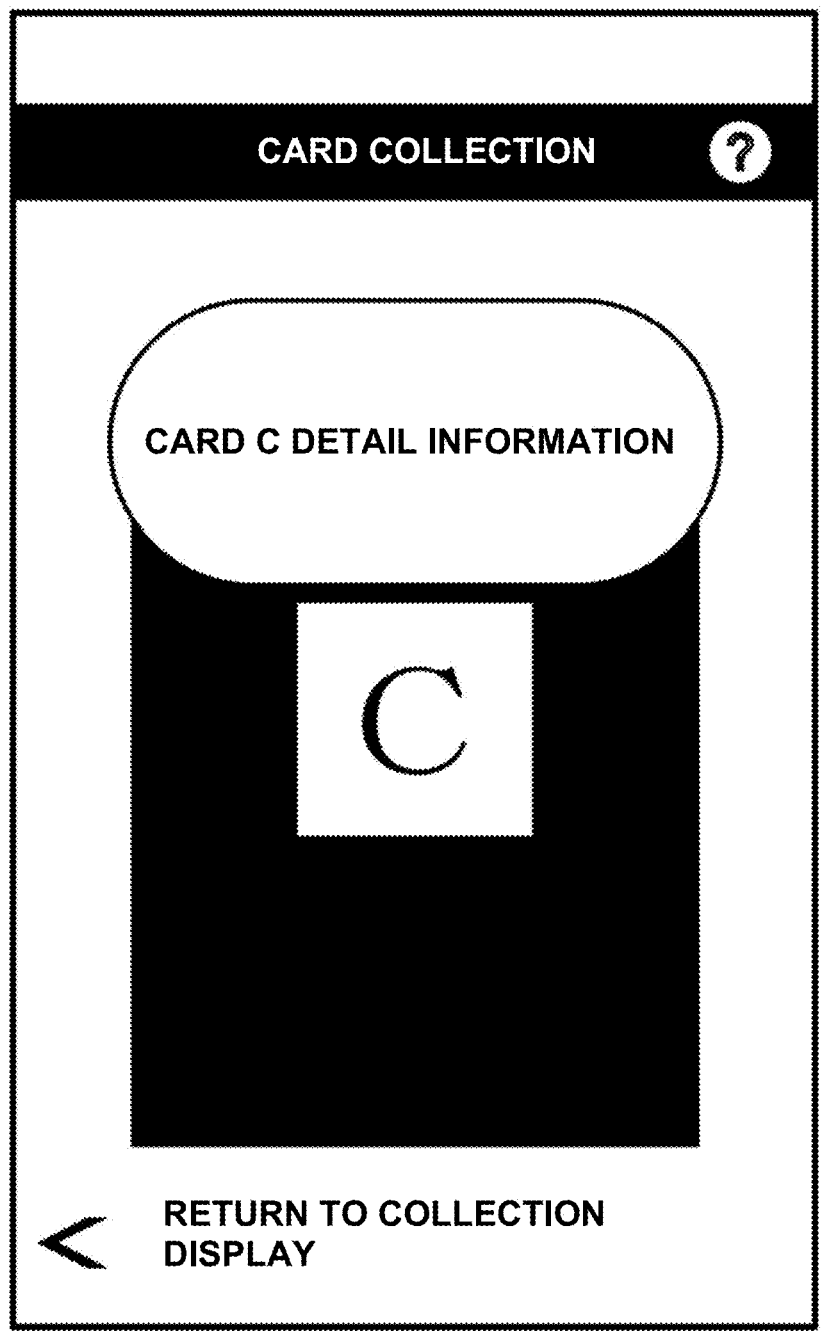
FIG. 14 is a diagram illustrating an example where the card C is enlarged to be displayed, and detail information about the card C is also displayed.

When the possess flag of the selected card is "1" (Step 203), the detail of the card is read from the card character data, and detail information about the card is displayed (Step 204). FIG. 13 illustrates an example where the card C, displayed in color and thus is possessed by the player, is touched to be selected among the displayed cards. FIG. 14 illustrates a result of the selection of the card C, where the card C is enlarged to be displayed, and the detail information about the card C is displayed.

Figure 15:
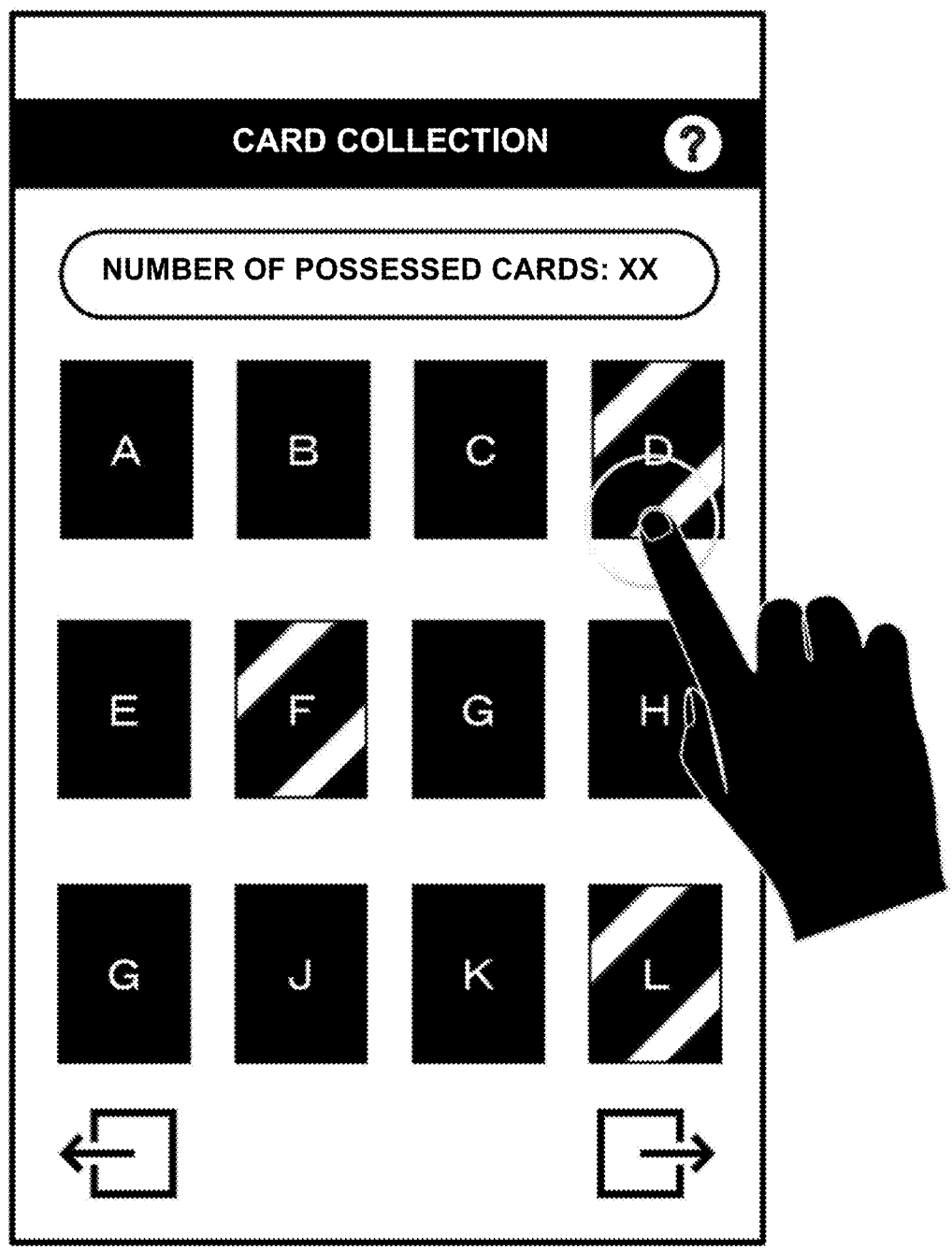
FIG. 15 illustrates an example where a card D is selected by being touched, the card D being one of the cards displayed that is not possessed by the player and being displayed in grayscale.
Figure 16:
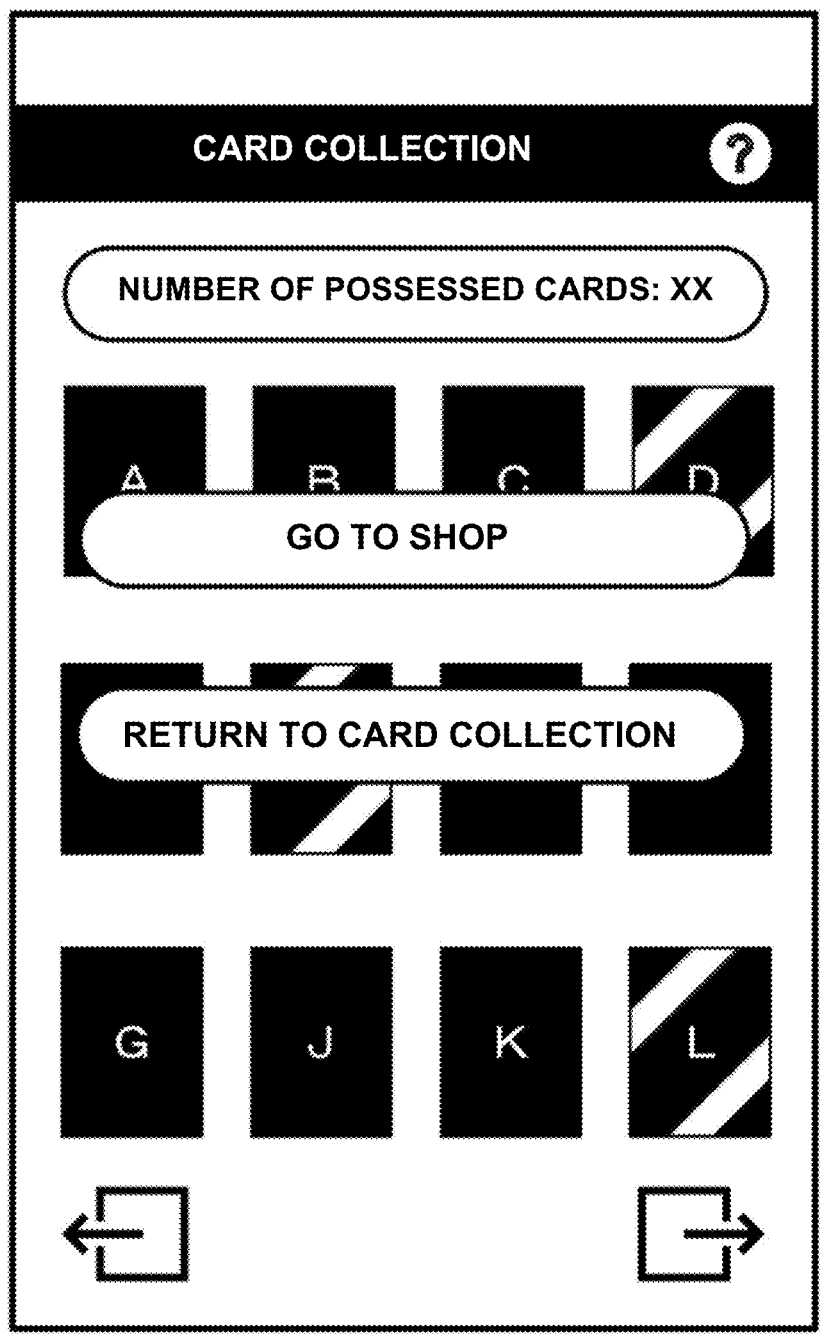
FIG. 16 is a diagram illustrating an example where the card D is selected and displayed on the display unit.

On the other hand, when the possess flag of the selected card is "0" (Step 203), a shop transition approval button (shop transition approval information) for approving the transition to the shop screen is displayed (Step 206). When the user touches (selects) the shop transition approval button to approve the transition to the shop screen (Step 207), the screen transition control unit 75 requests the game server 2 for the transition to the shop screen (Step 208). When the shop screen is received from the game server 2 (Step 209), transition to the shop screen occurs (Step 210). FIG. 15 illustrates an example where the card D, which is displayed in greyscale and thus is one of the displayed cards not possessed by the player, is touched to be selected. FIG. 16 illustrates an example of a result of selecting the card D, where "go to shop" as a button to approve the transition to the shop and "return to card collection" as a button to return the card collection without approving the transition to the shop are displayed. When the user selects the button "go to shop", the transition to the shop screen is approved, and the transition to a shop screen (top screen) illustrated in FIG. 17 occurs.

With the operation described above, direct transition to the shop screen (top screen) occurs as a result of selecting an unpossessed card. With this configuration, the player can be guided to the shop screen with a less chance of losing an interest in the card compared with a configuration where the transition to the shop screen occurs after returning to the home screen and then selecting the button for transitioning to the shop screen, whereby a high possibility of the player being guided to the shop screen can be maintained.

Next, the card provision processing (Step 3) and the card acquisition processing (Step 4) executed between the player terminal 1 and the game server 2 will be described.

Figure 18:
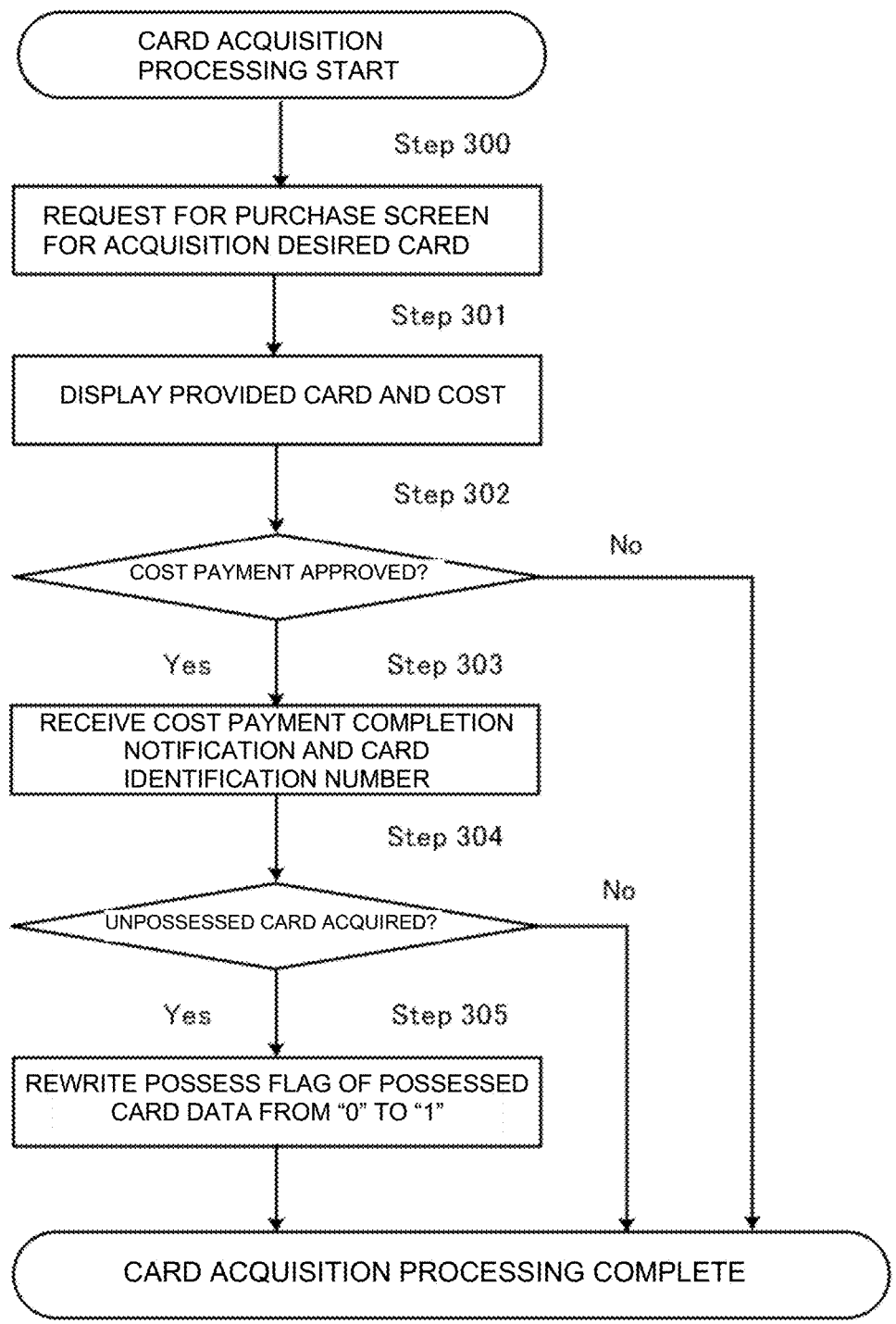
FIG. 18 is a flowchart illustrating operations in card acquisition processing (Step 3) in the player terminal 1.

First of all, the card acquisition processing (Step 3) in the player terminal 1 will be described. FIG. 18 is a flowchart illustrating operations in the card acquisition processing (Step 3) in the player terminal 1.

The player requests for a purchase screen for a card he or she wants to acquire, to purchase (acquire) the desired card (Step 300). The game server 2 provides a card in the following three ways:

(1) providing a desired card only;
(2) providing any one of cards of a series to which the desired card belongs, with the player having a certain chance of acquiring the desired card; and
(3) providing a package (a group including a plurality of cards of a series to which the desired card belongs) of a series including the desired card, with the package having a certain chance of including the card desired by the player.

Figure 19:
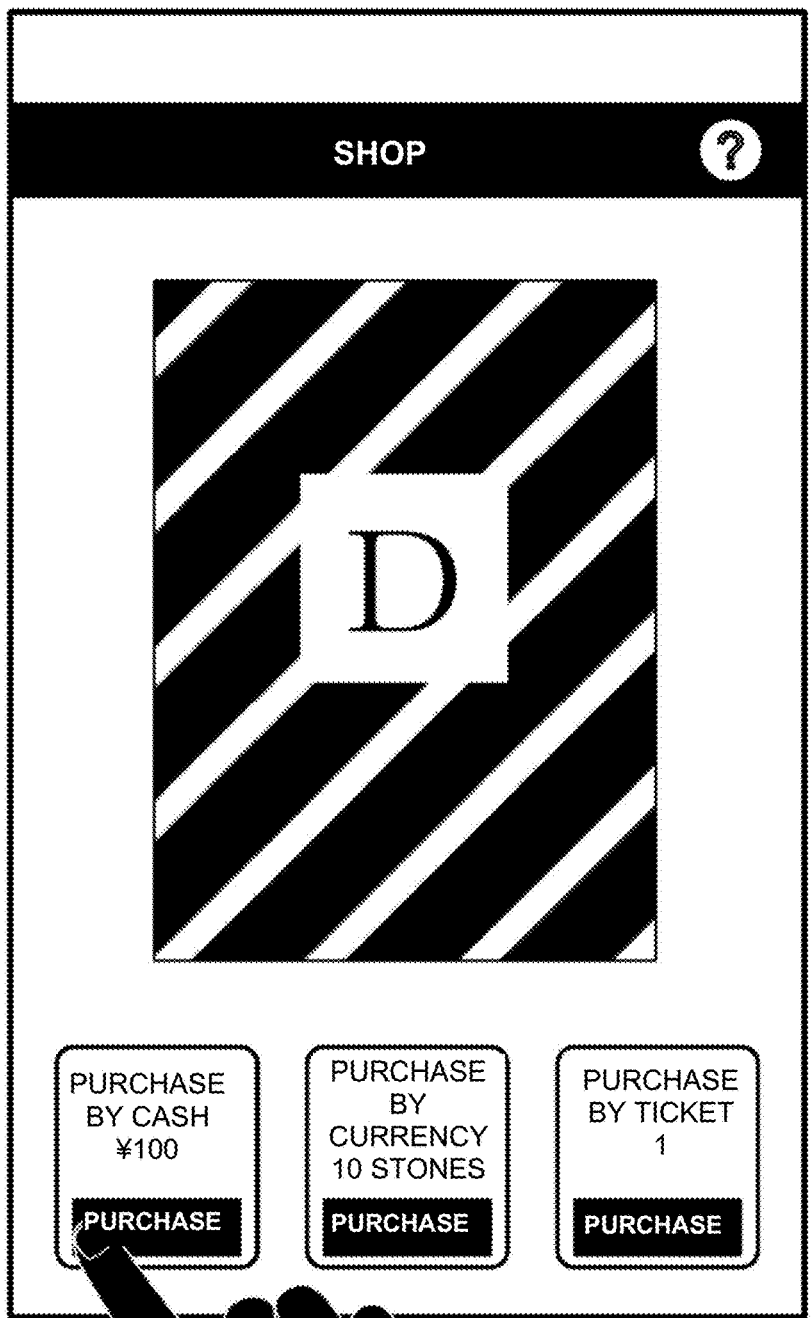
FIG. 19 illustrates an example of a case where only a desired card is provided, and illustrates the card D desired by the player and a button for approving payment of a cost (cash, currency in the game, ticket) for the card D.
Figure 20:
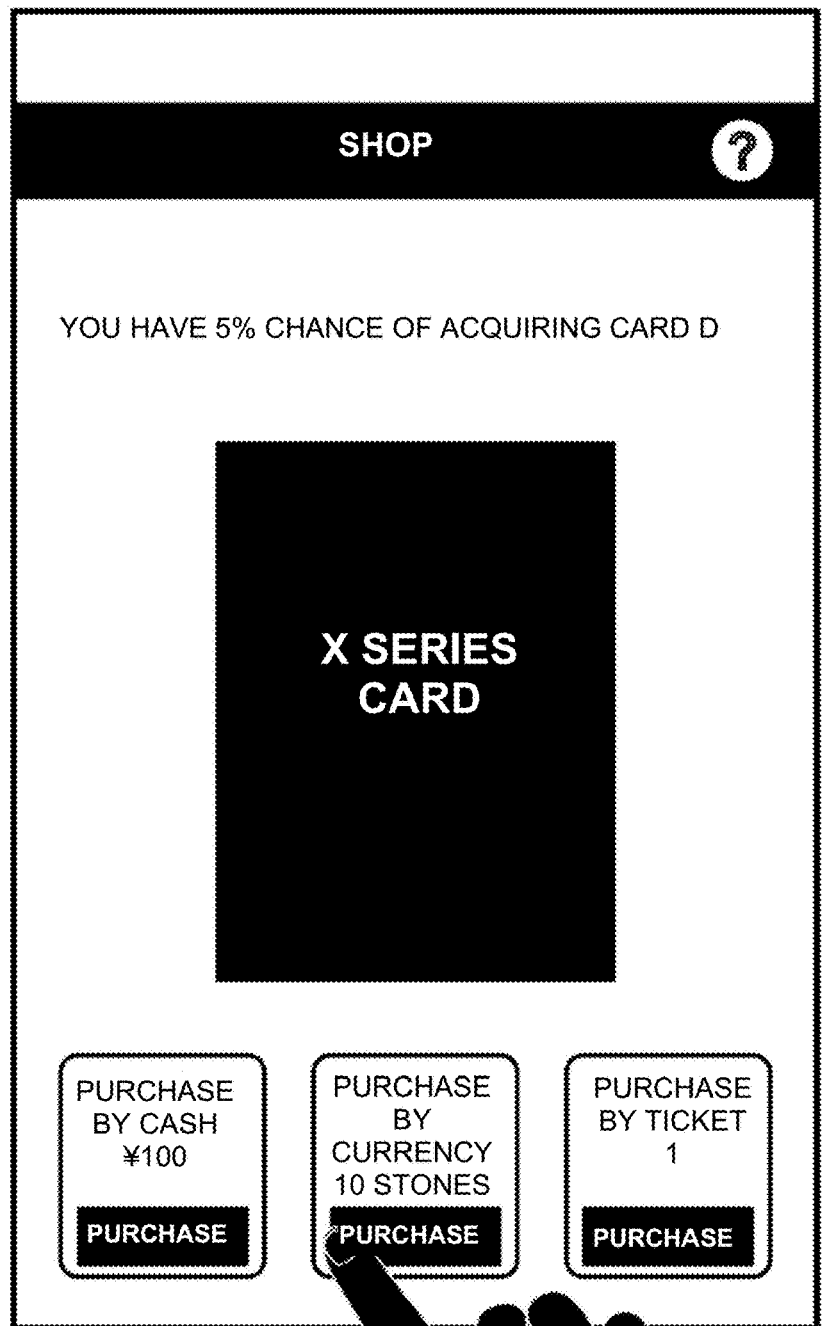
FIG. 20 illustrates an example of a case where any of a cards of a series to which a desired card belongs, and illustrates a message indicating the player has a 5% chance of acquiring the desired card D, and a button for approving payment of a cost (cash, currency in the game, ticket) for the card D.
Figure 21:
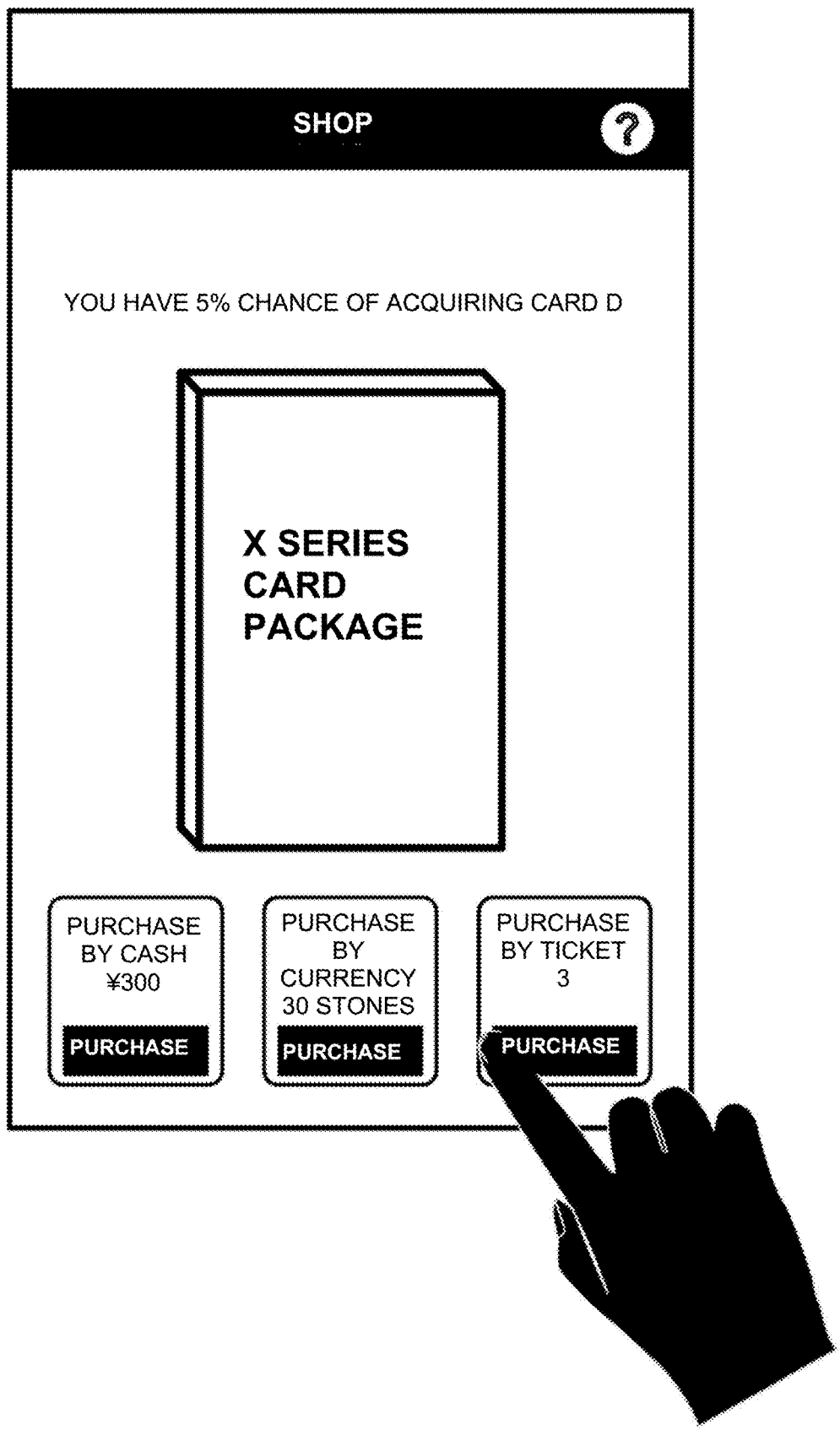
FIG. 21 illustrates an example where a package of a series to which the desired card belongs, and illustrates a message indicating that with the package, the player has a 5% chance of acquiring the desired card, and a button for approving payment of a cost (cash, currency in the game, ticket) for the card D.

The game server 2 presents the provided card and the cost through any of the above described ways, and the player terminal 1 displays the card and the cost (Step 301). FIG. 19 illustrates an example of the case where only the desired card is provided. Specifically, the figure exemplarily illustrates the card D desired by the player and a payment approval button for the cost (cash, currency in the game, and ticket) for the card D. FIG. 20 illustrates an example of the case where any of cards of a series to which the desired card belongs is provided. Specifically, the figure exemplarily illustrates a message indicating the player has a 5% chance of acquiring the desired card D, and the payment approval button for the cost (cash, currency in the game, and ticket) for the card D. FIG. 21 illustrates an example where a package of an X series to which the desired card belong is provided. Furthermore, a message indicating that, with the package, the player has a 5% chance of acquiring the card, and the payment approval button for the cost (cash, currency in the game, and ticket) for the package.

When the player selects the cost payment button to approve the payment of the cost (Step 302), a cost payment completion notification and card identification number of the acquired card are received from the game server 2 (Step 303).

The card acquisition unit 76 checks the card identification number of the acquired card and the possess flag of the possessed card data (Step 304). When the possess flag corresponding to the card identification number of the acquired card is "0" (unpossessed), the possess flag of the card identification number of the acquired card is rewritten to "1" (possessed) (Step 305).

Figure 22:
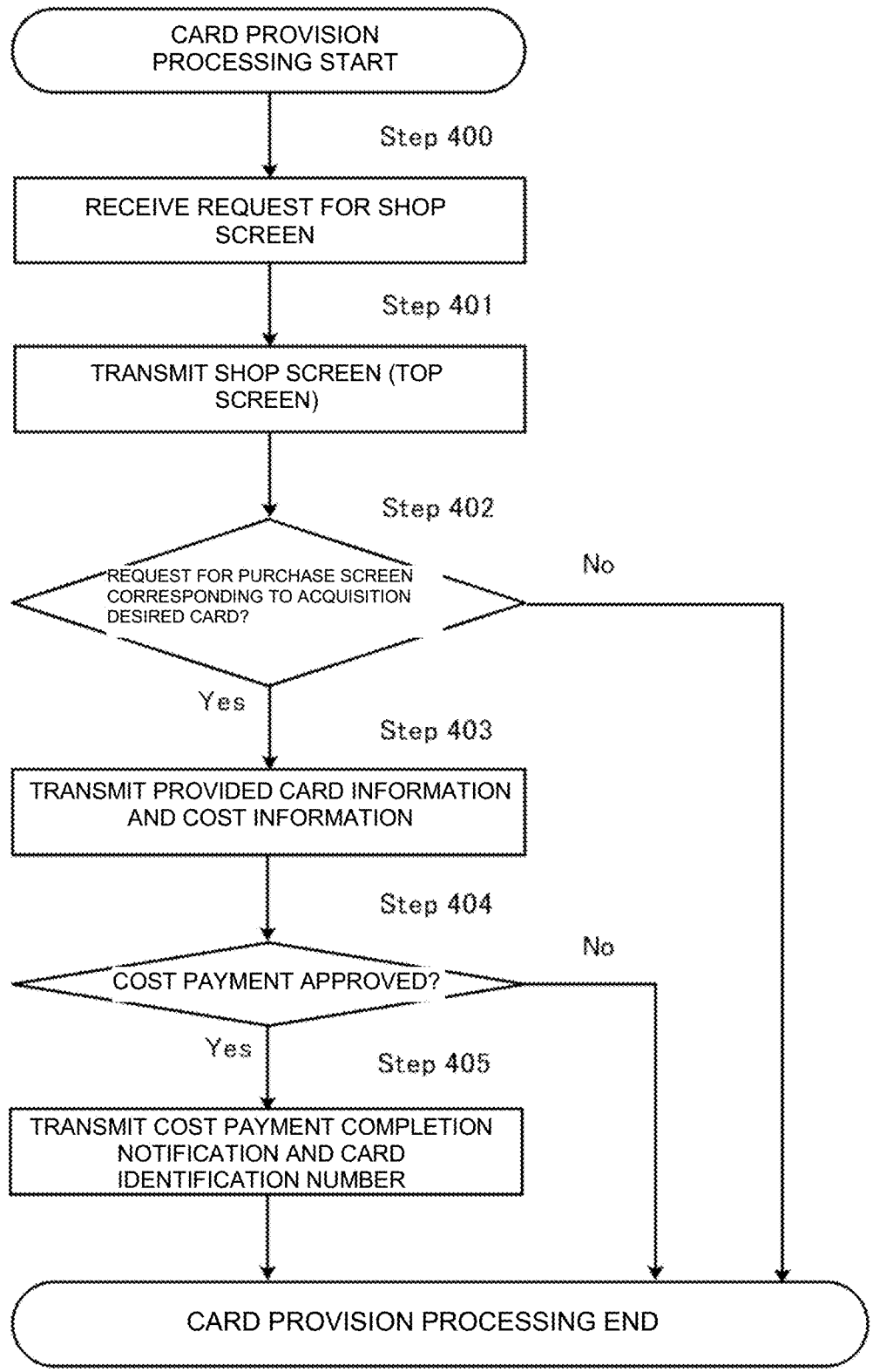
FIG. 22 is a flowchart illustrating operations in card provision processing (Step 4) in the game server 2.

Next, the card provision processing (Step 4) in the game server 2 will be described. FIG. 22 is a flowchart illustrating operations in the card provision processing (Step 4) in the game server 2.

The card provision unit 104 of the game server 2 receives the request for the shop screen from the terminal 1 (Step 400). The card provision unit 104 transmits the shop screen (top screen) to the terminal 1 (Step 401).

Then, when a request for the purchase screen for the acquisition desired card is issued for the player to purchase (acquire) the desired card (Step 402), the purchase screen corresponding to the acquisition desired card is transmitted, and the provided card information and the cost information are transmitted to the player terminal 1 (Step 403). The game server 2 provides the purchase screen corresponding to the acquisition desired card as appropriate, and provides the card through any of or any combination of the above described ways.

When the approval of the payment for the cost from the player terminal 1 is confirmed (Step 404) and thus the approval for the payment for the cost is confirmed, the card identification number and the payment completion notification for the provided card are transmitted to the player terminal 1 (Step 405).

With the configuration according to the present embodiment, the cards possessed by the player are displayed in the first display mode, and the cards not possessed by the player are displayed in the second display mode, so that the player can recognize whether he or she possesses the card at a glance. Furthermore, with the configuration, the transition to the shop screen occurs when a card displayed in the second display mode is selected. Thus, the player can be guided to the shop screen with a less chance of losing an interest in the card compared with a configuration where the transition to the shop screen occurs after returning to the home screen and then selecting the button for transitioning to the shop screen, whereby a high possibility of the player being guided to the shop screen can be maintained.

First Modification of Embodiment

Figure 17:
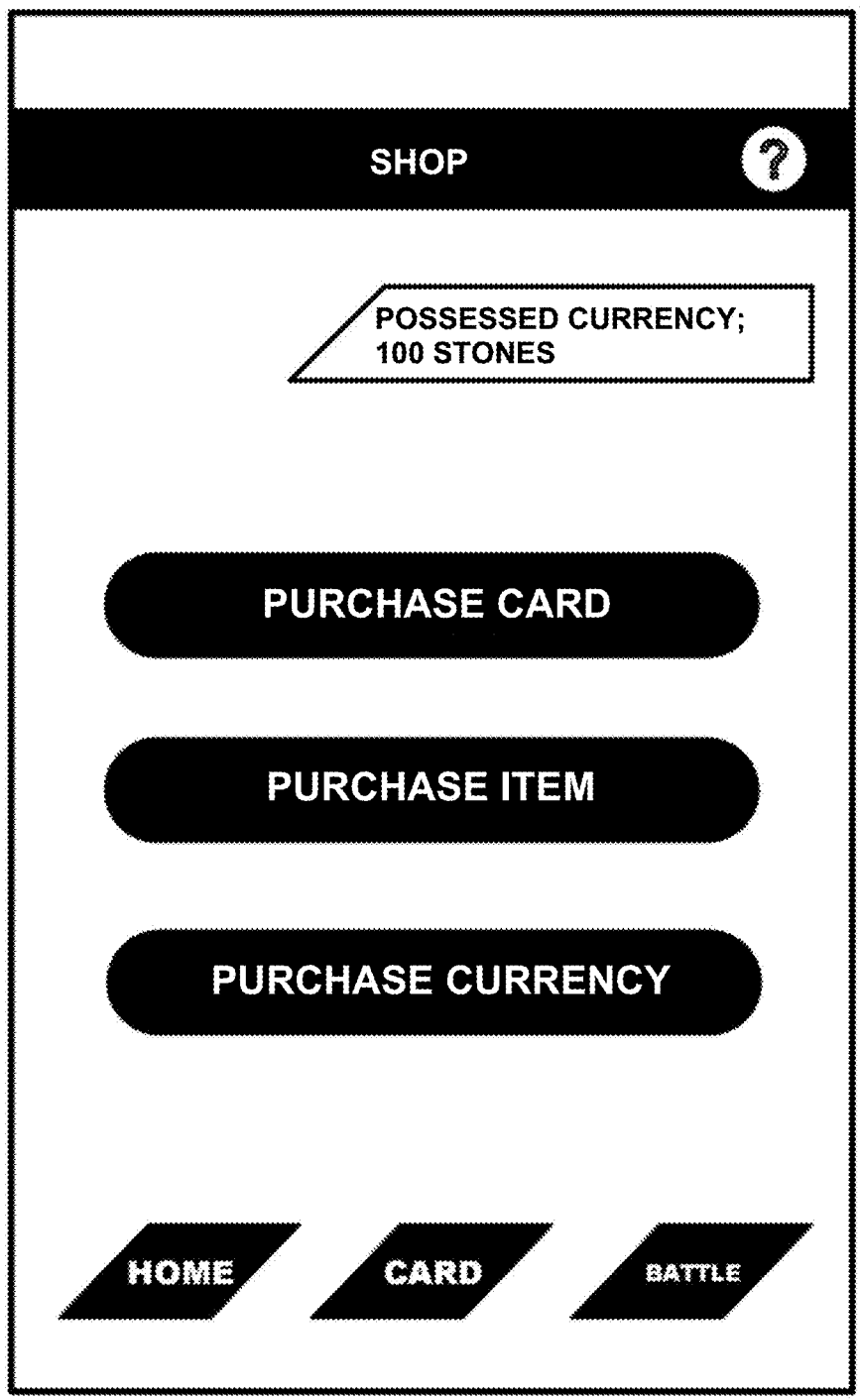
FIG. 17 is a diagram illustrating an example of a shop screen.

In the embodiment described above, an example of transitioning to the top screen of the shop illustrated in FIG. 17 is described. Alternatively, a configuration in which direct transition to a screen for acquiring a selected card (the screens illustrated in FIG. 19, FIG. 20, and FIG. 21) may occur without transitioning to the top screen of the shop.

With this configuration, usability of the player can be improved because he or she needs not to find the selected unpossessed card on the top screen of the shop, whereby the player can be guided to the shop screen without losing interest in the unpossessed.

In this case, the screen transition control unit 75 transmits the card identification number of the selected unpossessed card when issuing a request for the transition to the provision screen (shop screen). The card provision unit 104 of the game server 2 transmits the provision screen for providing the card corresponding to the received card identification number to the terminal 1 of the player. The terminal 1 receives the provision screen (card purchase screen) corresponding to the selected card, and displays the provision screen (card purchase screen).

Second Modification of Embodiment

In the embodiment described above, an example where the shop transition approval button (shop transition approval information) for approving the transition to the shop screen is displayed is described when the unpossessed card is selected. The unpossessed card may be enlarged to be displayed, as in the case where the possessed card is selected.

Figure 23:
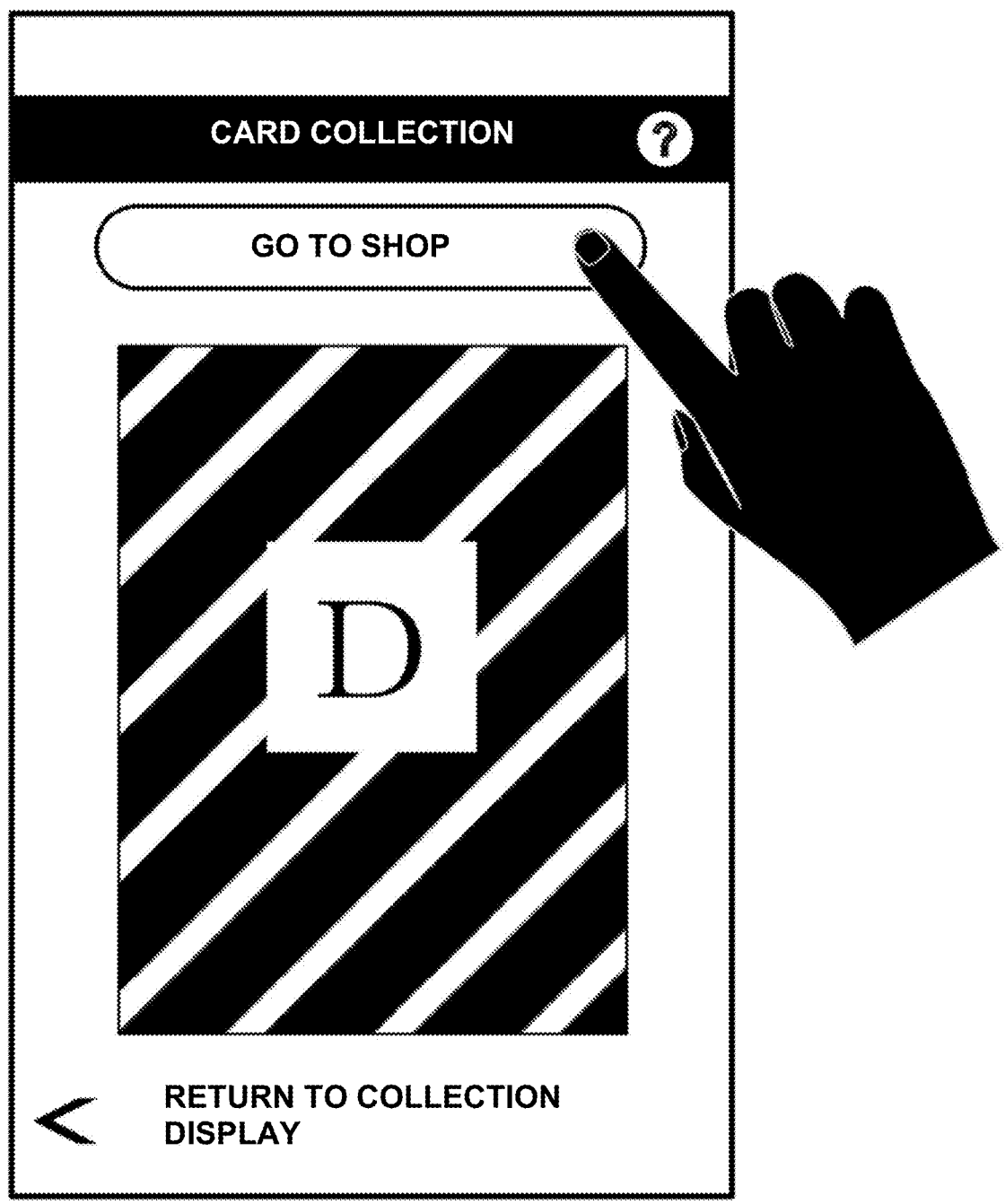
FIG. 23 illustrates an example where an unpossessed card is selected, and enlarged to be displayed.
Figure 24:
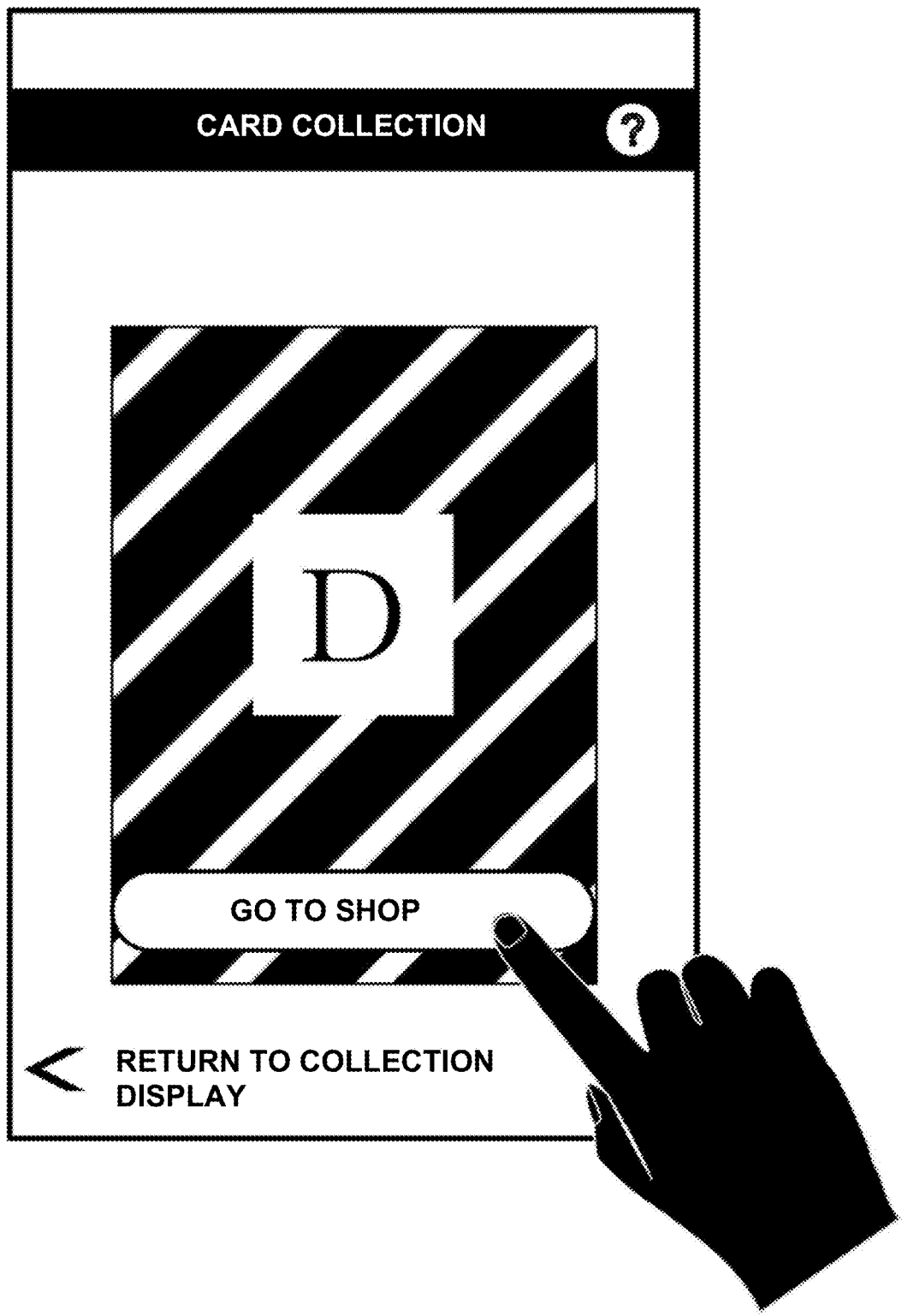
FIG. 24 illustrates an example where an unpossessed card is selected, and enlarged to be displayed.

FIG. 23 illustrates an example where the unpossessed card selected is enlarged to be displayed when the unpossessed card is selected. In the example illustrated in FIG. 23, the unpossessed card is enlarged to be displayed, and the shop transition approval button (shop transition approval information) is displayed without overlapping with the card. FIG. 24 illustrates an example where an unpossessed card selected is enlarged to be displayed. In the example illustrated in FIG. 24, the unpossessed card is enlarged to be displayed, and the shop transition approval button (shop transition approval information) is displayed to overlap with a card.

Figure 25:
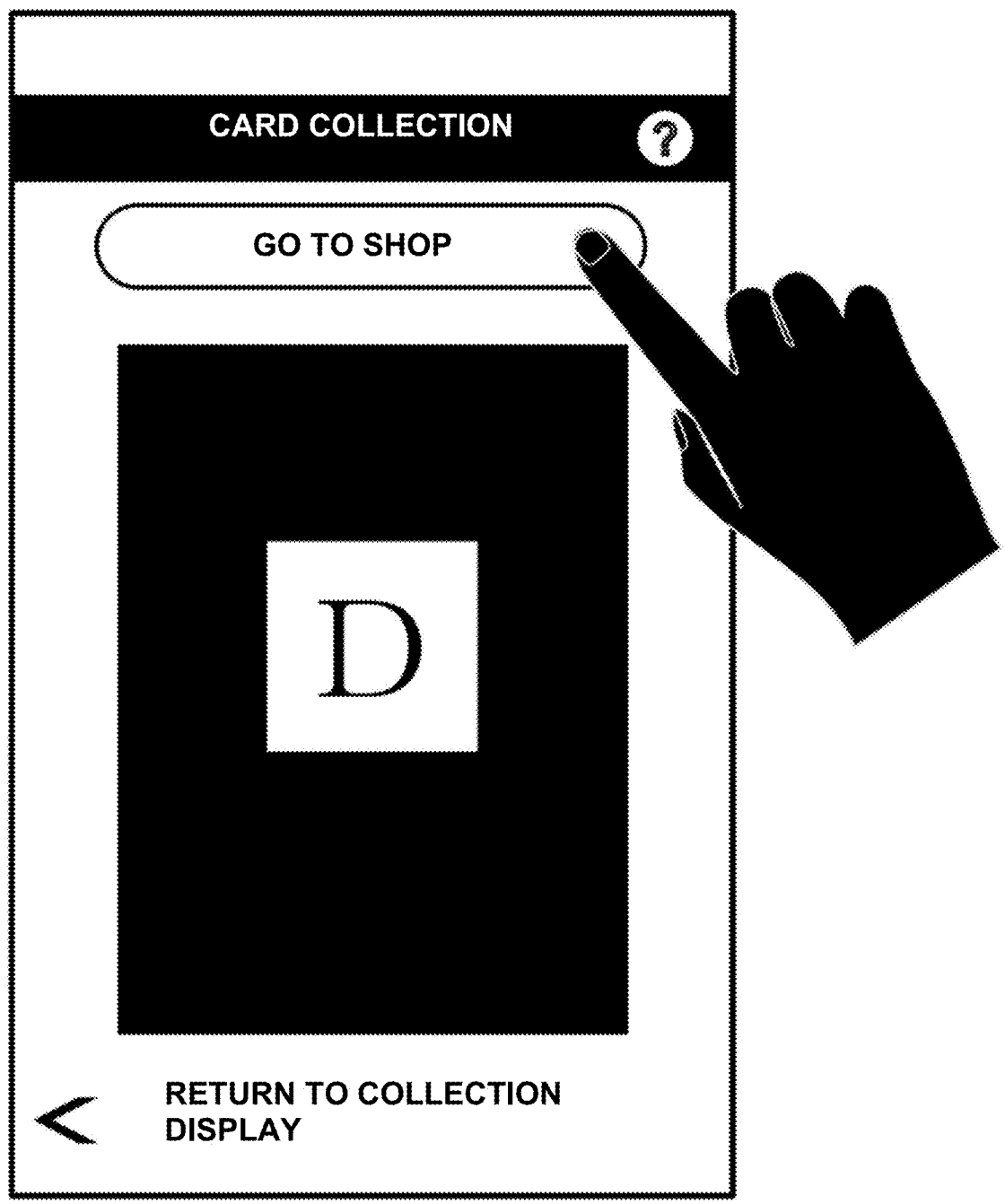
FIG. 25 illustrates an example where a display mode of the unpossessed card enlarged and displayed is changed to color (first display mode) from grayscale (second display mode)

Furthermore, the enlarged unpossessed card may be displayed with a display mode changed from grayscale (second coloring: second display mode) to color (first coloring: first display mode). FIG. 25 illustrates an example where the unpossessed card is enlarged to be displayed, with the display mode changed from grayscale (second display mode) to color (first display mode).

Together with the unpossessed card enlarged to be displayed, as illustrated in FIG. 14, the detail information about the unpossessed card may be displayed.

With this configuration, the detail of the unpossessed card can be recognized, whereby the player can be more interested in the unpossessed card.

Third Modification of Embodiment

In the above described embodiment, an example of the card collection enabling the list of cards to be viewed is described as an example of the target of changing the display mode of the card depending on whether the player possesses the card. However, this should not be construed in a limiting sense. For example, the display mode of the card may be changed depending on whether the player possesses the card, also on the deck setting screen for setting the deck with the deck setting unit 72.

Figure 26:
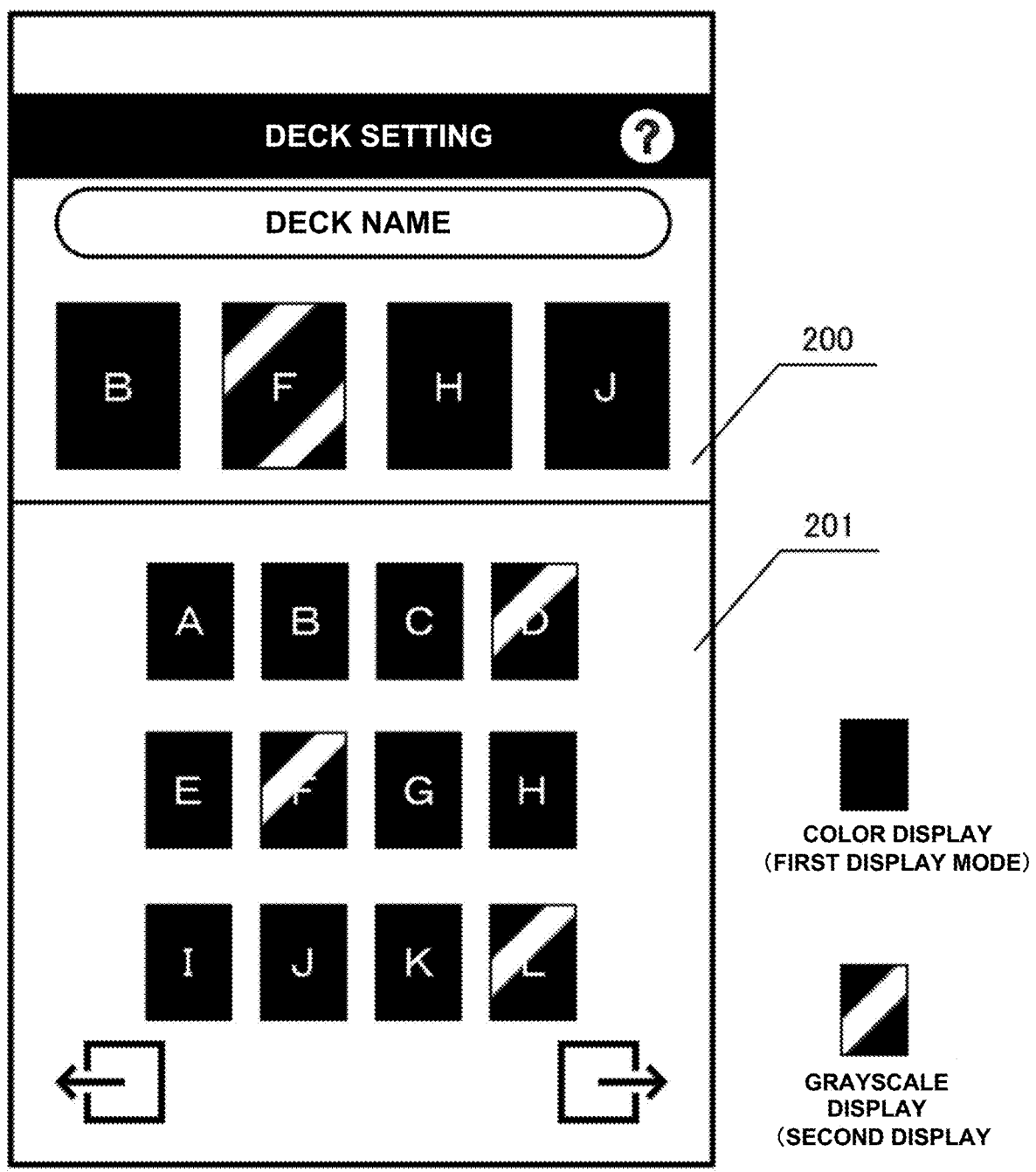
FIG. 26 is a diagram illustrating an example of changing the display mode of a card on a deck setting screen, depending on whether the player possesses the card.

FIG. 26 illustrates an example where the display mode of the card is changed depending on whether the card is possessed, on the deck setting screen. In FIG. 26, 200 denotes a region where the cards forming the deck are displayed, and 201 denotes a region where a list of cards provided by the game system is displayed. In the regions 200 and 201, the cards possessed by the player are displayed in color (first coloring: first display mode) and the cards not possessed by the player are displayed in grayscale (second coloring: second display mode). The player can select a card forming the deck, by dragging the card displayed in the region 201 to the region 200, regardless of the display mode, that is, regardless of whether he or she possesses the card. Note that the deck including the unpossessed card cannot be used for the competition. Alternatively, the deck including the unpossessed card may be usable in the competition, with the unpossessed card being unusable in the competition.

Figure 27:
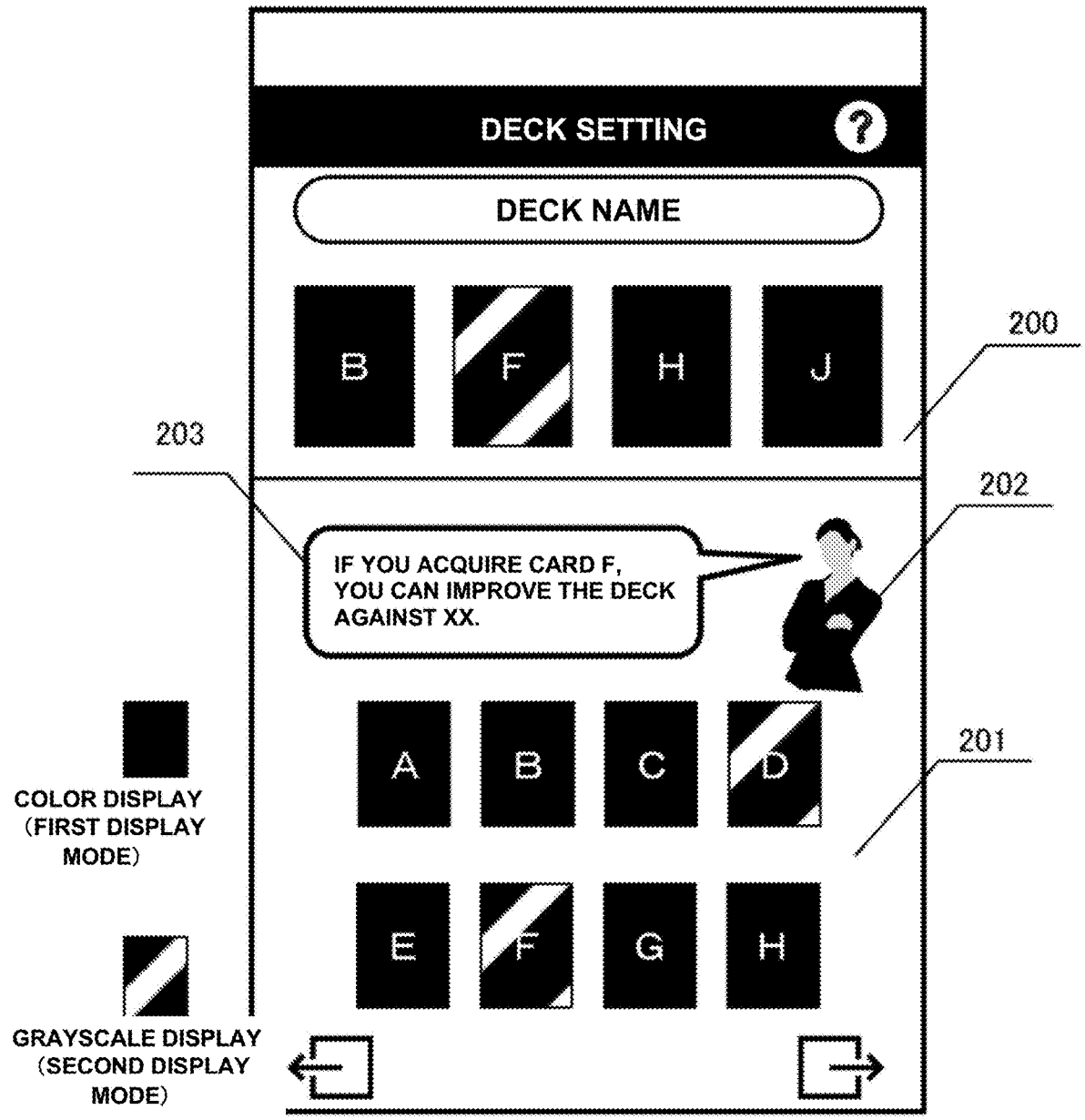
FIG. 27 illustrates an example where an advice from a buddy (second game element) is displayed when an unpossessed card is selected as a card forming a deck on the deck setting screen.

Furthermore, when an unpossessed card is selected as a card forming the deck, on the deck setting screen, a buddy (second game element) may give advice. Such a configuration may be achieved with the card identification information about the card selected as a card forming the deck transmitted from the deck setting unit 72 to the game server 2, and with the AI processing unit 103 of the game server 2 analyzing the information and transmitting advice information to the deck setting unit 72. The advice information indicates an advantage and disadvantage as a result of selecting the card as a card forming the deck. FIG. 27 illustrates an example of a case where advice from the buddy (second game element) is displayed in response to the selection of an unpossessed card as a card forming the deck on the deck setting screen. FIG. 27 illustrates a state where the player has selected the unpossessed card F as a card forming the deck, and the buddy (second game element) of the player giving advice regarding the advantage of the card F.

Also on the deck setting screen, when an unpossessed card displayed in grayscale (second coloring: second display mode) is selected (touched), direct transition to the shop screen occurs as in the embodiment described above.

With this configuration, the screen for setting the deck can directly transition to the shop screen for acquitting an unpossessed card. This is highly advantageous for the player who wants to improve his or her deck, considering the fact that the selection of the cards forming the deck has a direct impact on winning or losing the game.

In the embodiment described above, an example of the card game using virtual game cards is described, but the genre of the applicable game is not limited. For example, the game may be a sport competition game with a character associated with the first game element being an athlete.

A part or entirety of the embodiment described above can be described as the following notes, but the invention is not limited to the following notes.

Note 1

An information processing device configured to execute a competition game using a first game element, the device comprising:

a memory configured to store an execution instruction; and a processor, wherein the processor executes the execution instruction to execute:

display control processing of displaying a first game element possessed by a player in a first display mode, and displaying a first game element not possessed by the player in a second display mode different from the first display mode; and transition processing of transitioning, when a predetermined operation is performed on a first game element displayed in the second display mode, to a provision screen on which a procedure for providing the first game element is performed.

Note 2

An information processing device configured to execute a competition game using a first game element, the device comprising:

a memory configured to store an execution instruction; and a processor, wherein the processor executes the execution instruction to execute:

reception processing of receiving a request for provision of a first game element not possessed by a player, from a terminal displaying the first game element in different display modes depending on whether the player possesses the first game element; and transition processing of making a screen of the terminal transition to a provision screen on which a procedure for provision of the first game element is performed, in response to the request for the provision.

The present invention is described above based on a preferred embodiment. It should be noted that the present invention is not necessarily limited to the embodiment described above, and can be modified in various ways without departing from the technical idea thereof.

The invention claimed is:

1. A program control apparatus, comprising at least one processor and at least one non-volatile computer readable medium comprising computer code, the at least one non-volatile memory and the computer code configured to, with the processor, cause a computer to:

display a first game element possessed by a player in a first display mode, and display a first game element not possessed by the player in a second display mode different from the first display mode;

transition to a provision screen on which a procedure for provision of the first game element is performed, when a predetermined operation is performed on the first game element displayed in the second display mode; and acquire, in response to execution of a predetermined procedure on the provision screen, the first game element displayed in the second display mode, the first game element displayed in the second display mode with a predetermined probability, or a group of a plurality of the first game elements comprising the first game element displayed in the second display mode with a predetermined probability.

2. The program control apparatus according to claim 1, wherein the first display mode and the second display mode are display modes that are visually distinguishable from each other.

3. The program control apparatus according to claim 2, wherein the first display mode is a display mode with which the first game element is displayed in a first color, and the second display mode is a display mode with which the first game element is displayed in a second color.

4. The program control apparatus according to claim 1, wherein when the first game element not possessed by the player is acquired, the computer changes the display mode of the first game element from the second display mode to the first display mode.

5. The program control apparatus according to claim 1, wherein the predetermined operation is any one of a selection operation of selecting the first game element displayed in the second display mode, an approval operation of approving transition to the provision screen, or a combination of the selection operation and the approval operation.

6. The program control apparatus according to claim 1, wherein in response to the selection operation on the first game element displayed in the second display mode, the computer enlarges and displays the first game element.

7. The program control apparatus according to claim 6, wherein the computer displays information prompting transition to the provision screen, while superimposing the information on the first game element enlarged and displayed or not superimposing the information on the first game element enlarged and displayed.

8. The program control apparatus according to claim 1, wherein the predetermined procedure is approval of payment of a cost for acquiring the first game element displayed in the second display mode or approval of payment of a cost for acquiring the group.

9. The program control apparatus according to claim 1, wherein
each first game element belongs to one or more predetermined series, and
the computer acquires the first game element belonging to a series to which the first game element displayed in the second display mode belongs.

10. The program control apparatus according to claim 1, wherein
each first game element belongs to one or more predetermined series, and
the computer acquires the first game element not belonging to a series to which the first game element displayed in the second display mode belongs.

11. The program control apparatus according to claim 1 further causing the computer to set the first game element not possessed by the player to be a first game element to form a deck of the player.

12. The program control apparatus according to claim 11 further causing the computer to make the first game element displayed in the first display mode to be usable in a competition game, and to make the first game element displayed in the second display mode to be unusable in the competition game.

13. The program control apparatus according to claim 11 further causing the computer to make the first game element possessed by the player to be usable in a competition game, and to make the first game element not possessed by the player to be unusable in the competition game.

14. The program control apparatus according to claim 1, wherein the computer causes the transition to a first provision screen or a second provision screen, wherein the second provision screen comprises the first game element displayed in the second display mode and selected by the player is acquirable.

15. A program control apparatus, comprising at least one processor and at least one non-volatile computer readable medium comprising computer code, the at least one non-volatile memory and the computer code configured to, with the processor, cause the computer to:
display a first game element possessed by a player in a first display mode, and display a first game element not possessed by the player in a second display mode different from the first display mode;
transition to a provision screen on which a procedure for provision of the first game element is performed, when a predetermined operation is performed on the first game element displayed in the second display mode;
set a second game element comprising character information that is variable in accordance with a progress of a game, and is able to use the first game element;
acquire first game element information that is information about the first game element displayed in the second display mode and selected by the player, and corresponds to the character information about the second game element; and
provide the first game element information.

* * * * *